US010194450B2

(12) United States Patent
Cheng et al.

(10) Patent No.: US 10,194,450 B2
(45) Date of Patent: Jan. 29, 2019

(54) METHOD FOR TRANSMITTING CONTROL INFORMATION, USER EQUIPMENT AND BASE STATION

(71) Applicant: HUAWEI TECHNOLOGIES CO., LTD., Shenzhen (CN)

(72) Inventors: Yan Cheng, Beijing (CN); Yongxia Lv, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 202 days.

(21) Appl. No.: 14/267,413

(22) Filed: May 1, 2014

(65) Prior Publication Data
US 2014/0233419 A1  Aug. 21, 2014

Related U.S. Application Data

(63) Continuation of application No. PCT/CN2012/084099, filed on Nov. 5, 2012.

(30) Foreign Application Priority Data

Nov. 4, 2011  (CN) .......................... 2011 1 0347706

(51) Int. Cl.
*H04L 1/00* (2006.01)
*H04W 72/08* (2009.01)
(Continued)

(52) U.S. Cl.
CPC ......... *H04W 72/085* (2013.01); *H04L 1/0026* (2013.01); *H04L 1/0031* (2013.01);
(Continued)

(58) Field of Classification Search
None
See application file for complete search history.

(56) References Cited

U.S. PATENT DOCUMENTS 4,217,660 A * 8/1980 En .......................... H03M 13/23
714/787
2004/0003094 A1 * 1/2004 See ....................... H04L 43/026
709/227
(Continued)

FOREIGN PATENT DOCUMENTS

CN  101499878  8/2009
CN  101702631  5/2010
(Continued)

OTHER PUBLICATIONS

International Search Report dated Feb. 14, 2013 in corresponding International Patent Application No. PCT/CN2012/084099.

*Primary Examiner* — Huy D Vu
*Assistant Examiner* — Bao G Nguyen
(74) *Attorney, Agent, or Firm* — Staas & Halsey LLP

(57) ABSTRACT

Embodiments of the present invention disclose a method for transmitting control information, a user equipment and a base station. The method includes: obtaining a resource occupied by first UCI, and obtaining a resource occupied by second UCI; performing channel encoding on the first UCI according to the resource occupied by the first UCI to obtain an encoded bit sequence of the first UCI, and performing channel encoding on the second UCI according to the resource occupied by the second UCI to obtain an encoded bit sequence of the second UCI; mapping the encoded bit sequence of the first UCI and the encoded bit sequence of the second UCI to a physical uplink channel, so as to transmit to a base station.

4 Claims, 7 Drawing Sheets

(51) Int. Cl.
*H04L 5/00* (2006.01)
*H04L 1/16* (2006.01)

(52) U.S. Cl.
CPC .......... *H04L 1/0057* (2013.01); *H04L 1/0059* (2013.01); *H04L 1/0073* (2013.01); *H04L 1/1671* (2013.01); *H04L 5/0053* (2013.01); *H04L 5/0055* (2013.01)

(56) References Cited

U.S. PATENT DOCUMENTS

2013/0322391 A1* 12/2013 Yang .................. H04L 5/001
   370/329
2014/0269600 A1* 9/2014 Lee .................. H04L 5/0007
   370/329

FOREIGN PATENT DOCUMENTS

CN 101902313 12/2010
CN 101984568 3/2011

* cited by examiner

METHOD FOR TRANSMITTING CONTROL INFORMATION, USER EQUIPMENT AND BASE STATION

CROSS-REFERENCE TO RELATED APPLICATIONS

This application is a continuation of International Application No. PCT/CN2012/084099, filed on Nov. 5, 2012, which claims priority to Chinese Patent Application No. 201110347706.1, filed on Nov. 4, 2011, both of which are hereby incorporated by reference in their entireties.

TECHNICAL FIELD

Embodiments of the present invention relate to the field of radio communications, and in particular, to a method for transmitting control information, a user equipment and a base station.

BACKGROUND

LTE-A (long term evolution-advanced) is a further evolved and enhanced system of an LTE system. In the LTE-A system, to satisfy the peak data rate requirement of International Telecommunication Union for the $4^{th}$ generation communication technology, a carrier aggregation (CA) technology is introduced, which is also referred to as a spectrum aggregation technology or a bandwidth extension technology. In the carrier aggregation, spectrums of two or more component carriers are aggregated to obtain a larger transmission bandwidth. The spectrum of each component carrier may be adjacent continuous spectrums or non-adjacent spectrums in the same frequency band or even discontinuous spectrums in different frequency bands. A user equipment (UE) of LTE Rel-8/9 can only access one of the component carriers to perform data transmitting and receiving, while a user equipment of the LTE-A may access multiple component carriers at the same time to perform data transmitting and receiving according to capability and a service requirement of the user equipment.

In order to support technologies such as dynamic scheduling and downlink multiple input multiple output (MIMO) transmission and hybrid automatic retransmission, a terminal needs to feed back uplink control information (UCI) to a base station, which includes channel state information CSI and hybrid automatic repeat request-acknowledgment information (HARQ-ACK), where the hybrid automatic repeat request-acknowledgment information may also be simply referred to as ACK (Acknowledgment, acknowledgment information)/NACK (Negative Acknowledgment, negative acknowledgment information). In the LTE-A, since the carrier aggregation technology is introduced, when a user equipment accesses multiple downlink component carriers at the same time to receive downlink data, for each downlink component carrier, the user equipment needs to feed back its channel state information in an uplink direction, and for data scheduled on the each downlink component carrier, the user equipment also needs to feed back its hybrid automatic repeat request-acknowledgment information in the uplink direction. Therefore, the channel state information and the hybrid automatic repeat request-acknowledgment information may need to be reported on an uplink subframe at the same time, where the channel state information to be reported may correspond to one or multiple downlink carriers and the hybrid automatic repeat request-acknowledgment information to be reported may also correspond to one or multiple downlink carriers.

The CSI includes periodic CSI and non-periodic CSI. The periodic CSI includes information such as a channel quality indicator (CQI), a precoding matrix indicator (PMI), a rank indication (RI) and a precoding type indicator (PTI). The periodic CSI has multiple reporting modes on a physical uplink control channel (PUCCH). For example, in an LTE Rel-10 system, reporting modes of the periodic CSI include mode 1-0, mode 1-1, mode 2-0 and mode 2-1. A reporting mode corresponds to multiple reporting types and different reporting types correspond to different reported content. For example, in the LTE Rel-10 system, the periodic CSI includes the following several reporting types: type 1 (Type 1), supporting sub-band CQI feedback selected by a user equipment; type 1a (Type 1a), supporting sub-band CQI and second PMI feedback; type 2a (Type 2a), supporting wideband PMI feedback; type 3 (Type 3), supporting RI feedback; type 4 (Type 4), supporting wideband CQI feedback; type 5 (Type 5), supporting RI and wideband PMI feedback; and type 6 (Type 6), supporting RI and PTI feedback. Different reporting types of the periodic CSI correspond to different reported content and different reported content corresponds to different performance goals and requirements, so different reporting types of the periodic CSI correspond to different performance goals and requirements. For example, the performance goal and requirement of the Type 3 is block error rate BLER=10e−3, while the performance goal and requirement of the type 4 is block error rate BLER=10e−2.

A base station semi-statically configures a reporting mode, a reporting period and a subframe offset of the periodic CSI of each carrier through high-layer signaling, a user equipment determines, according to the reporting mode indicated by the high-layer signaling, the reporting type corresponding to the CSI to be reported, and determines the reporting moment of the CSI of each reporting type according to the reporting period and the subframe offset indicated by the high-layer signaling. For each carrier, the CSI of only one reporting type is reported at a reporting moment. The reporting modes of the periodic CSI of different carriers may be the same or may be different. In a scenario of carrier aggregation, the channel state information of multiple downlink carriers may need to be reported on one subframe, so the CSI of different reporting types from different carriers may be reported on the one subframe.

Therefore, in a scenario of LTE-A carrier aggregation, the channel state information and the hybrid automatic repeat request-acknowledgment information may need to be reported on an uplink subframe at the same time. The channel state information to be reported may be corresponding one or multiple downlink carriers, and when the channel state information to be reported corresponds to multiple downlink carriers, the reporting type of the periodic CSI corresponding to each downlink carrier may be the same or different; and the hybrid automatic repeat request-acknowledgment information to be reported may also be corresponding one or multiple downlink carriers. However, because the performance goals and requirements corresponding to the CSI of different reporting types are inconsistent, and the performance goals and requirements corresponding to the periodic CQI/PMI are also inconsistent with the performance goals and requirements of the hybrid automatic repeat request-acknowledgment information, how to ensure that both the CSI of different reporting types and the hybrid automatic repeat request-acknowledgment information reach a performance requirement is a problem to be solved.

A solution is to jointly encode all uplink control information to be transmitted, and on a subframe with uplink control information of different performance goals and requirements for feedback, improve the transmission power, so that the UCI with a high performance goal and requirement can also reach the performance goal.

However, in the solution, to enable that the UCI of that type with high performance goal and requirement can also reach the performance goal, the user equipment adopts higher transmission power when sending the UCI, but for the UCI of that type with low performance goal and requirement, the transmission power is excessively high, thereby wasting the transmission power of the user equipment and lowering the power utilization efficiency.

The solution is inapplicable to a user equipment with limited power. If power of the user equipment is limited, the user equipment cannot increase the transmission power, and therefore, the UCI of that type with high performance goal and requirement cannot reach the performance requirement through the method for increasing the transmission power.

SUMMARY

Embodiments of the present invention provide a method for transmitting control information, a user equipment and a base station, which can improve power utilization efficiency.

In one aspect, a method for transmitting control information is provided and includes: obtaining a resource occupied by first uplink control information UCI, and obtaining a resource occupied by second UCI; performing channel encoding on the first UCI according to the resource occupied by the first UCI to obtain an encoded bit sequence of the first UCI, and performing channel encoding on the second UCI according to the resource occupied by the second UCI to obtain an encoded bit sequence of the second UCI; and mapping the encoded bit sequence of the first UCI and the encoded bit sequence of the second UCI to a physical uplink channel, so as to transmit to a base station.

In another aspect, a method for transmitting control information is provided and includes: obtaining a resource occupied by first uplink control information UCI, and obtaining a resource occupied by second UCI; and performing channel decoding on the first UCI according to the resource occupied by the first UCI to obtain the first UCI transmitted by a user equipment, and performing channel decoding on the second UCI according to the resource occupied by the second UCI to obtain the second UCI transmitted by the user equipment.

In another aspect, a user equipment is provided and includes: an obtaining unit, configured to obtain a resource occupied by first uplink control information UCI and obtain a resource occupied by second UCI; an encoding unit, configured to perform channel encoding on the first UCI according to the resource occupied by the first UCI to obtain an encoded bit sequence of the first UCI, and perform channel encoding on the second UCI according to the resource occupied by the second UCI to obtain an encoded bit sequence of the second UCI; and a mapping unit, configured to map the encoded bit sequence of the first UCI and the encoded bit sequence of the second UCI to a physical uplink channel, so as to transmit to a base station.

In another aspect, a base station is provided and includes: an obtaining unit, configured to obtain a resource occupied by first uplink control information UCI, and obtain a resource occupied by second UCI; and an decoding unit, configured to perform channel decoding on the first UCI according to the resource occupied by the first UCI to obtain the first UCI transmitted by a user equipment, and perform channel decoding on the second UCI according to the resource occupied by the second UCI to obtain the second UCI transmitted by the user equipment.

In the embodiments of the present invention, independent encoding is performed on first UCI and second UCI, and resources corresponding to the first UCI and the second UCI may be allocated according to performance goals and requirements of different UCI, which ensures that different UCI reaches respective performance goals and requirements, and meanwhile, avoids increasing transmission power according to the UCI with the highest performance requirement, thereby improving the power utilization efficiency.

BRIEF DESCRIPTION OF DRAWINGS

To describe the technical solutions according to the embodiments of the present invention more clearly, accompanying drawings for describing the embodiments are introduced briefly in the following. Apparently, the accompanying drawings in the following description are only some embodiments of the present invention, and persons of ordinary skill in the art can derive other drawings according to the accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are only a part rather than all of the embodiments of the present invention. All other embodiments obtained by persons of ordinary skill in the art based on the embodiments of the present invention without creative efforts shall fall within the protection scope of the present invention.

The technical solutions of the present invention may be applied to various communication systems, for example, GSM, a code division multiple access (CDMA) system, wideband code division multiple access (WCDMA) system, general packet radio service (GPRS, General Packet Radio Service) system and long term evolution (LTE) system.

A user equipment (UE, User Equipment), which may also be called a mobile terminal (Mobile Terminal) and a mobile user equipment, may communicate with one or multiple core networks through a radio access network (for example, RAN, Radio Access Network). The user equipment may be a mobile terminal, such as a mobile phone (or referred to as a "cellular" phone) and a computer with a mobile terminal, for example, may be a portable, pocket-type, handheld, computer built-in or vehicle-mounted mobile device, which exchange language and/or data with the radio access network.

A base station may be a base station (BTS, Base Transceiver Station) in GSM or CDMA, or a base station (NodeB) in WCDMA, or an evolved base station (eNB or e-NodeB, evolved NodeB) in LTE, which is not limited in the present invention.

Figure 1:
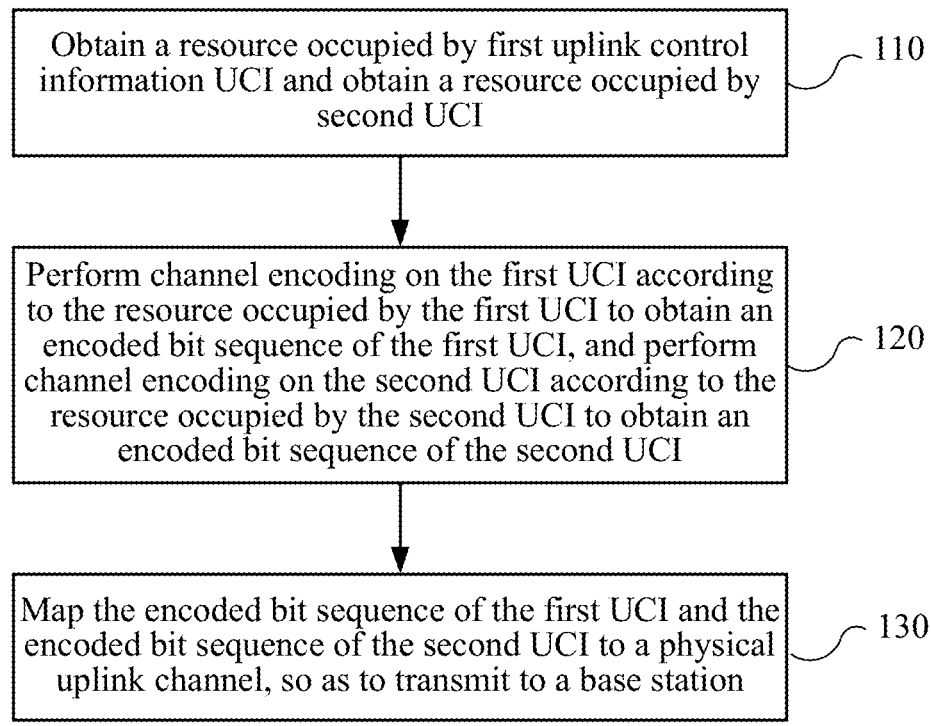
FIG. 1 is a schematic flow chart of a method for transmitting control information according to an embodiment of the present invention.

FIG. 1 is a schematic flow chart of a method for transmitting control information according to an embodiment of the present invention. The method in FIG. 1 is performed by a UE.

110: Obtain a resource occupied by first uplink control information UCI and obtain a resource occupied by second UCI.

Optionally, in an embodiment, the first UCI may be periodic channel state information CSI, and the second UCI may be a hybrid automatic repeat request-acknowledgment message HARQ-ACK.

Optionally, in another embodiment, the second UCI may be hybrid automatic repeat request-acknowledgment information HARQ-ACK and a scheduling request SR or the first UCI may be periodic channel state information CSI and a scheduling request SR.

Optionally, in another embodiment, the UE obtains the resource occupied by the first UCI in the following cases: In a case that the periodic CSI includes CSI of a first reporting type or CSI of a second reporting type, the UE may obtain a resource occupied by the CSI of the first reporting type or the CSI of the second reporting type. Or, in a case that the periodic CSI includes CSI of a first reporting type and CSI of a second reporting type, the UE may obtain the resource occupied by the CSI of the first reporting type and discard the CSI of the second reporting type, or the UE obtains the resource occupied by the CSI of the first reporting type and obtains the resource occupied by the CSI of the second reporting type. Optionally, a performance requirement of the CSI of the first reporting type is higher than a performance requirement of the CSI of the second reporting type.

Optionally, in another embodiment, that the UE obtains the resource occupied by the first UCI may include: obtaining, by the UE, the resource occupied by the periodic CSI, where the periodic CSI is from all or part of information in the periodic CSI corresponding to a first carrier, the first carrier corresponds to a downlink carrier, and when the periodic CSI of multiple downlink carriers all needs to be reported on a current subframe, priority of the periodic CSI corresponding to the first carrier is the highest. Optionally, the priority of the periodic CSI may be sorted according to the following rules: The periodic CSI with a highest-priority CSI reporting type has the highest priority, and if the reporting types of the periodic CSI of multiple downlink carriers are the same, the periodic CSI of a downlink carrier with a smallest carrier index has the highest priority. Optionally, the priority of the periodic CSI may further be sorted according to the following rules: The priority of the periodic CSI of the downlink carrier not associated with an uplink carrier is higher than that of the periodic CSI of the downlink carrier associated with the uplink carrier; among the periodic CSI of multiple downlink carriers not associated with uplink carriers, the periodic CSI of the highest-priority CSI reporting type has the highest priority; and if the reporting types of the periodic CSI of multiple downlink carriers not associated with uplink carriers are the same, the periodic CSI of the downlink carrier with a smallest carrier index has the highest priority, where, the downlink carrier not associated with the uplink carrier indicates that, among uplink carriers configured for the UE, no uplink carrier is associated with the downlink carrier SIB-2.

120: Perform channel encoding on the first UCI according to the resource occupied by the first UCI to obtain an encoded bit sequence of the first UCI, and perform channel encoding on the second UCI according to the resource occupied by the second UCI to obtain an encoded bit sequence of the second UCI.

Optionally, in an embodiment, in a case that the resource is the number of modulation symbols, the UE may calculate the number of encoded bits occupied by the first UCI according to the number of modulation symbols occupied by the first UCI and calculate the number of encoded bits occupied by the second UCI according to the number of modulation symbols occupied by the second UCI. The UE may perform channel encoding on the first UCI according to the number of encoded bits occupied by the first UCI to obtain the encoded bit sequence of the first UCI, and perform channel encoding on the second UCI according to the number of encoded bits occupied by the second UCI to obtain the encoded bit sequence of the second UCI. Or, in a case that the resource is the number of encoded bits, the UE may perform channel encoding on the first UCI according to the number of encoded bits occupied by the first UCI to obtain the encoded bit sequence of the first UCI, and perform channel encoding on the second UCI according to the number of encoded bits occupied by the second UCI to obtain the encoded bit sequence of the second UCI.

Optionally, in another embodiment, the number $Q'_{CSI}$ of modulation symbols occupied by the first UCI may be calculated according to the following formula (1) or formula (2):

$$Q'_{CSI} = Q' \quad (1)$$

$$Q'_{CSI} = Q' - Q'_{HARQ\text{-}ACK} \quad (2)$$

The number $Q'_{HARQ\text{-}ACK}$ of modulation symbols occupied by the second UCI may be calculated according to formula (3) or formula (4) or formula (5) or formula (6) or formula (7):

$$Q'_{HARQ\text{-}ACK} = \lceil Q'*(O_{HARQ\text{-}ACK}/(O_{CSI} + O_{HARQ\text{-}ACK}))*C\beta_{offset} \rceil \quad (3)$$

$$Q'_{HARQ\text{-}ACK} = \lceil Q'*(O_{HARQ\text{-}ACK}/(O_{CSI} + O_{HARQ\text{-}ACK})) \rceil \quad (4)$$

$$Q'_{HARQ\text{-}ACK} = \lceil (2/3)*Q'*(O_{HARQ\text{-}ACK}/O_{CSI}) \rceil \quad (5)$$

$$Q'_{HARQ\text{-}ACK} = \lceil (O_{HARQ\text{-}ACK}*((M_{SC}^{PUCCH}*N_{symb}^{PUCCH})/V_{SF})*\beta_{offset})/O_{CSI} \rceil \quad (6)$$

$$Q'_{HARQ\text{-}ACK} = N_{symb}^{HARQ\text{-}ACK} * M_{SC}^{PUCCH} \quad (7)$$

where, Q' is capacity of a physical uplink channel, $O_{HARQ\text{-}ACK}$ is the total number of information bits of the HARQ-ACK or the number of information bits of the HARQ-ACK and the number of bits of the scheduling request SR, $O_{CSI}$ is the total number of information bits of the periodic CSI, $\beta_{offset}$ is a value configured semi-statically by high-layer signaling or a preset value, $M_{SC}^{PUCCH}$ is the number of subcarriers allocated to the physical uplink channel, $N_{symb}^{PUCCH}$ is the number of time domain SC-FDMA symbols used by the physical uplink channel to transmit the UCI, $V_{SF}$ is a value of a spread spectrum coefficient, and $N_{symb}^{HARQ-ARK}$ is the number of time domain SC-FDMA symbols used for transmitting the HARQ-ACK.

Optionally, in another embodiment, the number $Q_{CSI}$ of encoded bits occupied by the first UCI may be calculated according to the following formula (8):

$$Q_{CSI}=Q'_{CSI}*Q_m \qquad (8)$$

the number $Q_{ACK}$ of encoded bits occupied by the second UCI may be calculated according to the following formula (9):

$$Q_{ACK}=Q'_{HARQ-ACK}*Q_m \qquad (9)$$

where $Q'_{CSI}$ is the number of modulation symbols occupied by the first UCI, $Q'_{HARQ-ACK}$ is the number of modulation symbols occupied by the second UCI, and $Q_m$ is a modulation order.

Optionally, in another embodiment, in the case that the periodic CSI includes the CSI of the first reporting type and the CSI of the second reporting type, the UE calculates the number of encoded bits occupied by the first UCI according to the number of modulation symbols occupied by the first UCI, which may be implemented through the following method: The UE may calculate the number of encoded bits occupied by the CSI of the first reporting type according to the number of modulation symbols occupied by the CSI of the first reporting type, and calculate the number of encoded bits occupied by the CSI of the second reporting type according to the number of modulation symbols occupied by the CSI of the second reporting type.

Optionally, in another embodiment, the CSI of the first reporting type may be a rank indication RI, and the CSI of the second reporting type may be a channel quality indicator CQI/a precoding matrix indicator PMI.

Optionally, in another embodiment, the CSI of the first reporting type may include CSI corresponding to reporting type 3, CSI corresponding to reporting type 5 and CSI corresponding to reporting type 6. Optionally, CSI corresponding to reporting type 2a may further be included.

Optionally, the CSI of the second reporting type includes the following reporting types of the periodic CSI: reporting type 2, reporting type 2b, reporting type 2c and reporting type 4, reporting type 1 and reporting type 1a.

Optionally, in another embodiment, the number $Q'_{RI}$ of modulation symbols occupied by the CSI of the first reporting type may be calculated according to the following formula (10) or formula (11):

$$Q'_{RI} = \left\lceil \frac{O_{RI} \times M_{sc}^{PUSCH} \times N_{symb}^{PUSCH} \times \beta_{offset}^{RI}}{O_{CQI-MIN}} \right\rceil \qquad (10)$$

$$Q'_{RI} = \left\lceil \frac{O_{Ri} \times M_{sc}^{PUSCH} \times N_{symb}^{PUSCH} \times \beta_{offset}^{RI}}{O_{CQI-MIN} + O_{RI}} \right\rceil \qquad (11)$$

the number $Q'_{CQI/PMI}$ of modulation symbols occupied by the CSI of the second reporting type may be calculated according to the following formula (12):

$$Q'_{CQI/PMI}=M_{SC}^{PUSCH} \times N_{symb}^{PUSCH}-Q'_{RI} \qquad (12)$$

the number $Q'_{HARQ-ACK}$ of modulation symbols occupied by the second UCI may be calculated according to the following formula (13) or formula (14) or formula (15):

$$Q'_{HARQ-ACK} = \min\left(\left\lceil \frac{O_{HARQ-ACK} \times M_{sc}^{PUSCH} \times N_{symb}^{PUSCH} \times \beta_{offset}^{HARQ-ACK}}{O_{CQI-MIN}} \right\rceil, 4 \times M_{sc}^{PUSCH}\right) \qquad (13)$$

$$Q'_{HARQ-ACK} = \min\left(\left\lceil \frac{O_{HARQ-ACK} \times M_{sc}^{PUSCH} \times N_{symb}^{PUSCH} \times \beta_{offset}^{HARQ-ACK}}{O_{CQI-MIN} + O_{RI}} \right\rceil, 4 \times M_{sc}^{PUSCH}\right) \qquad (14)$$

$$Q'_{HARQ-ACK} = \min\left(\left\lceil \frac{O_{HARQ-ACK} \times M_{sc}^{PUSCH} \times N_{symb}^{PUSCH} \times \beta_{offset}^{HARQ-ACK}}{O_{CQI-MIN} + O_{RI}} \right\rceil, 8 \times M_{sc}^{PUSCH}\right) \qquad (15)$$

where, $O_{RI}$ is the total number of information bits of the RI, $M_{SC}^{PUSCH}$ is the number of subcarriers allocated to a physical uplink shared channel PUSCH, $N_{symb}^{PUSCH}$ is the number of time domain symbols, used for transmitting the UCI, of the PUSCH, $O_{HARQ-ACK}$ is the total number of information bits of the HARQ-ACK, $O_{CQI-MIN}$ is the total number of information bits of the CQI/PMI, and $\beta_{offset}^{RI}$ and $\beta_{offset}^{HARQ-ACK}$ are values notified by high-layer radio resource control signaling and configured semi-statically by high-layer signaling.

Optionally, in another embodiment, the number $Q_{RI}$ of encoded bits occupied by the CSI of the first reporting type may be calculated according to the following formula (16):

$$Q_{RI}=Q'_{RI}*Q_m \qquad (16)$$

the number $Q_{CQI/PMI}$ of encoded bits occupied by the CSI of the second reporting type may be calculated according to the following formula (17):

$$Q_{CQI/PMI}=Q'_{CQI/PMI}*Q_m \qquad (17)$$

the number $Q_{ACK}$ of encoded bits occupied by the second UCI may be calculated according to the following formula (18):

$$Q_{ACK}=Q'_{HARQ-ACK}*Q_m \qquad (18)$$

where $Q'_{RI}$ is the number of modulation symbols occupied by the CSI of the first reporting type, $Q'_{CQI/PMI}$ is the number of modulation symbols occupied by the CSI of the second reporting type, $Q'_{HARQ-ACK}$ is the number of modulation symbols occupied by the second UCI, and $Q_m$ is a modulation order.

Optionally, in another embodiment, in the case that the periodic CSI includes the CSI of the first reporting type and the CSI of the second reporting type, the UE may perform channel encoding on the CSI of the first reporting type according to the number of encoded bits occupied by the CSI of the first reporting type to obtain an encoded bit sequence of the CSI of the first reporting type, perform channel encoding on the CSI of the second reporting type according to the number of encoded bits occupied by the CSI of the second reporting type to obtain an encoded bit sequence of the CSI of the second reporting type, and multiplex the encoded bit sequence of the CSI of the first reporting type and the encoded bit sequence of the CSI of the second reporting type to obtain the encoded bit sequence of the first UCI.

130: Map the encoded bit sequence of the first UCI and the encoded bit sequence of the second UCI to a physical uplink channel, so as to transmit to a base station.

Optionally, in another embodiment, the UE may convert the encoded bit sequence of the first UCI into an encoded vector sequence of the first UCI and convert the encoded bit sequence of the second UCI into an encoded vector sequence of the second UCI; perform channel interleaving on the encoded vector sequence of the first UCI and the encoded vector sequence of the second UCI, to obtain the encoded bit sequence of the UCI; and map the encoded bit sequence of the UCI to the physical uplink channel, so as to transmit to a base station.

Optionally, in another embodiment, the UE may write the encoded vector sequence of the first UCI into a matrix, write the encoded vector sequence of the second UCI into a column, indicated by a column set, in the matrix, and then read encoded bits of each column in the matrix in order successively, to obtain the encoded bit sequence of the UCI.

Optionally, in another embodiment, the UE may write the encoded vector sequence of the first UCI into the matrix to make the matrix full.

Optionally, in another embodiment, the UE may write the encoded vector sequence of the second UCI into a column, indicated by a column set, in the matrix, write the encoded vector sequence of the first UCI into the matrix, and read encoded bits of each column in the matrix in order successively, to obtain the encoded bit sequence of the UCI.

Optionally, in another embodiment, the column set may be {0, 1}, or {0, 3, 2, 1}, or {1, 2}, or {0, 2}, or {0, 5, 4, 1, 2, 3}, or {2, 3}, or {1, 4}, or {1, 4, 3, 2}, or {1, 4, 7, 10, 2, 3, 8, 9}, or {1, 2, 4, 3, 7, 8, 10, 9}, and the UE may write the encoded vector sequence of the second UCI into the matrix according to the column indicated in the foregoing column set.

In the embodiment of the present invention, independent encoding is performed on the first UCI and the second UCI, and resources corresponding to the first UCI and the second UCI may be allocated according to performance goals and requirements of different UCI, which ensures that different UCI reaches respective performance goals and requirements, and meanwhile, avoids increasing transmission power according to the UCI with the highest performance requirement, thereby improving power utilization efficiency.

Figure 2:
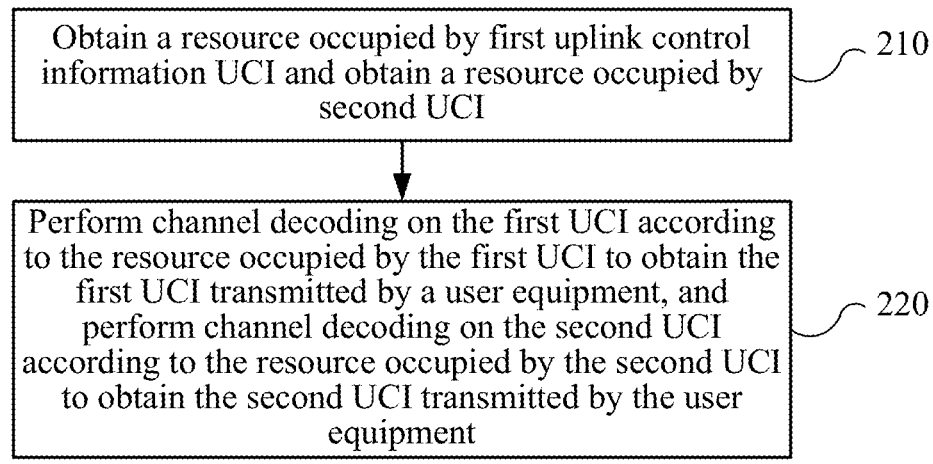
FIG. 2 is a schematic flow chart of a method for transmitting control information according to another embodiment of the present invention.

FIG. 2 is a schematic flow chart of a method for transmitting control information according to another embodiment of the present invention. The method in FIG. 2 is performed by a base station.

210: Obtain a resource occupied by first uplink control information UCI and obtain a resource occupied by second UCI.

Optionally, in an embodiment, the first UCI may be periodic channel state information CSI, and the second UCI may be a hybrid automatic repeat request-acknowledgment message HARQ-ACK.

Optionally, in another embodiment, the second UCI may be hybrid automatic repeat request-acknowledgment information HARQ-ACK and a scheduling request SR or the first UCI may be periodic channel state information CSI and a scheduling request SR.

Optionally, in another embodiment, the base station may obtain the resource occupied by the first UCI in the following cases: In a case that the periodic CSI includes CSI of a first reporting type or CSI of a second reporting type, the base station may obtain a resource occupied by the CSI of the first reporting type or the CSI of the second reporting type. Or, in a case that the periodic CSI includes the channel state information CSI of the first reporting type and the CSI of the second reporting type, the base station may obtain the resource occupied by the CSI of the first reporting type, and discard the CSI of the second reporting type, or the base station may respectively obtain the resource occupied by the CSI of the first reporting type and obtain the resource occupied by the CSI of the second reporting type, where a performance requirement of the CSI of the first reporting type is higher than a performance requirement of the CSI of the second reporting type.

220: Perform channel decoding on the first UCI according to the resource occupied by the first UCI to obtain the first UCI transmitted by a UE, and perform channel decoding on the second UCI according to the resource occupied by the second UCI to obtain the second UCI transmitted by the UE.

Optionally, in another embodiment, the base station may separate modulation symbols corresponding to the first UCI on the physical uplink channel according to the resource occupied by the first UCI, and separate modulation symbols corresponding to the second UCI on the physical uplink channel according to the resource occupied by the second UCI. The base station may perform channel decoding on the first UCI according to the modulation symbols corresponding to the first UCI to obtain the first UCI transmitted by the UE, and perform channel decoding on the second UCI according to the modulation symbols corresponding to the second UCI to obtain the second UCI transmitted by the UE.

In the embodiment of the present invention, independent encoding is performed on the first UCI and the second UCI, and resources corresponding to the first UCI and the second UCI may be allocated according to performance goals and requirements of different UCI, which ensures that different UCI reaches respective performance goals and requirements, and meanwhile, avoids increasing transmission power according to the UCI with the highest performance requirement, thereby improving power utilization efficiency.

The following describes the embodiments of the present invention in detail in combination with specific examples.

Embodiment 1

Figure 3:
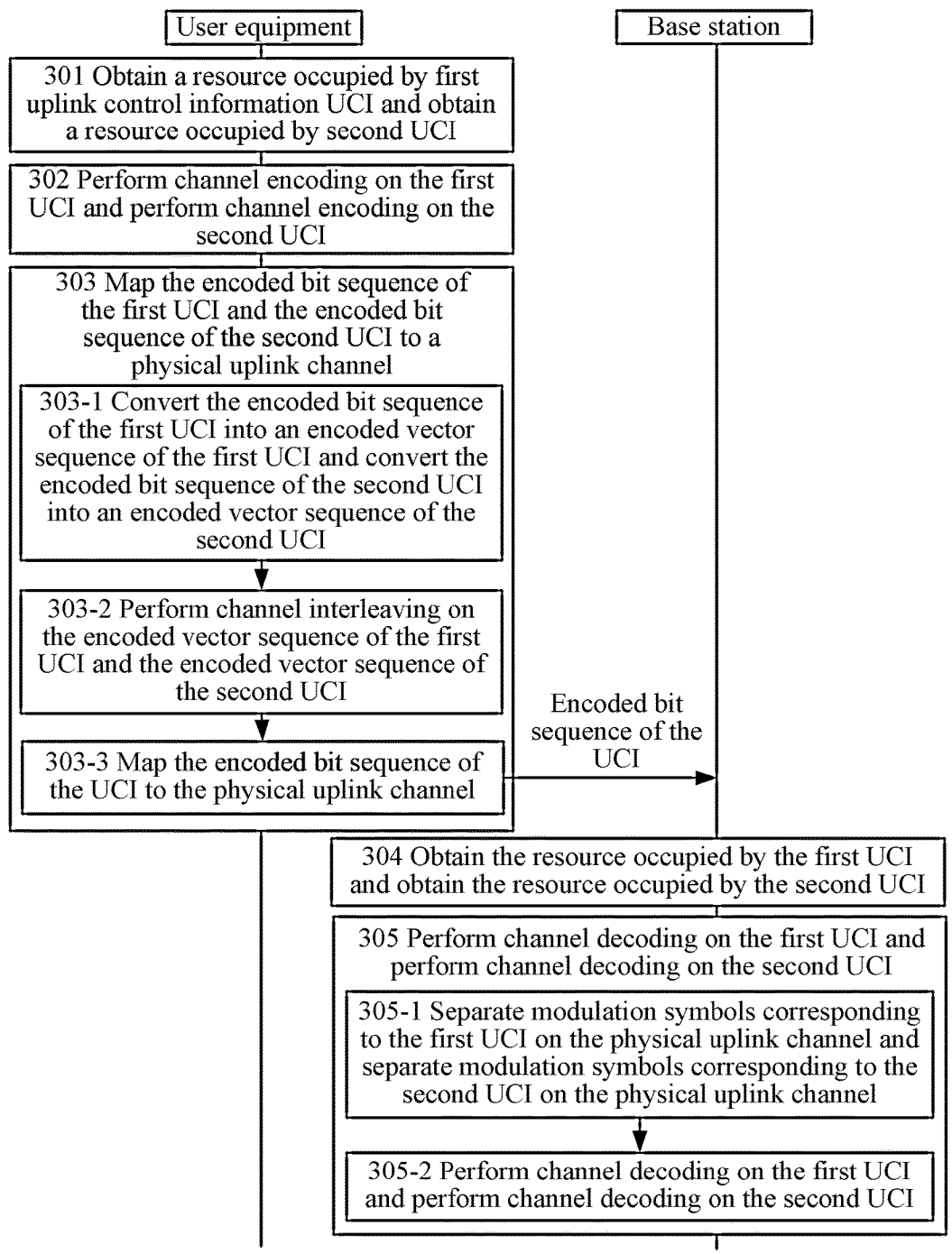
FIG. 3 is a schematic flow chart of a process of transmitting control information according to an embodiment of the present invention.

FIG. 3 is a schematic flow chart of a process of transmitting control information according to an embodiment of the present invention.

Step 301: A UE obtains a resource occupied by first uplink control information UCI and obtains a resource occupied by second UCI.

For example, in a carrier aggregation scenario of LTE-A (Long Term Evolution-Advanced, long term evolution-advanced), channel state information (Channel State Information, CSI) and hybrid automatic repeat request-acknowledgment information (Hybrid Automatic Repeat request-Acknowledgment, HARQ-ACK) may need to be reported on an uplink subframe at the same time. The CSI includes periodic CSI and non-periodic CSI. The periodic CSI includes information such as a channel quality indicator (Channel quality Indicator, CQI), a precoding matrix indicator (Precoding Matrix Indicator, PMI), a rank indication (Rank Indication, RI) and a precoding type indicator (Precoding type indicator, PTI). The periodic CSI has multiple reporting modes on a PUCCH, and for example, in an LTE Rel-10 system, reporting modes of the periodic CSI include mode 1-0, mode 1-1, mode 2-0 and mode 2-1. A reporting mode corresponds to multiple reporting types and different reporting types correspond to different reported content. At present, in the LTE Rel-10 system, the periodic CSI includes the following several reporting types: type 1 (Type 1), supporting sub-band CQI feedback selected by a UE; type 1a (Type 1a), supporting sub-band CQI and second PMI feedback; type 2a (Type 2a), supporting wideband PMI feedback; type 3 (Type 3), supporting RI feedback; type 4 (Type 4), supporting wideband CQI feedback; type 5 (Type 5), supporting RI and wideband PMI feedback; and type 6 (Type 6), supporting RI and PTI feedback. A performance requirement of the system on a certain reporting type is higher than the performance requirement on other reporting types, and for example, a performance goal and requirement of the reporting type 3 is that the block error rate BLER=10e−3, while the performance goal and requirement of type 4 is that the block error rate BLER=10e−2. In addition, in the LTE system, the performance goal and requirement of the HARQ-ACK is generally higher than that of the periodic CQI/PMI, for example, at least bit error rate BER=10e−3.

Optionally, in an embodiment, the first UCI may be the periodic CSI, and the second UCI may be the HARQ-ACK. The periodic CSI may belong to the first reporting type or the second reporting type. Optionally, the performance requirement of the system on the first reporting type is higher than that on the second reporting type, and the reporting type included in the first reporting type and the second reporting type is not limited in the embodiment of the present invention. But preferably, the first reporting type may include reporting type 3, reporting type 5 and reporting type 6, and the second reporting type may include reporting type 2, reporting type 2b, reporting type 2c, reporting type 4, reporting type 1, reporting type 1a and reporting type 2a. In addition, the reporting type 2a may also belong to the first reporting type. The periodic CSI only belongs to the first reporting type or the second reporting type, namely, when both the first UCI and the second UCI need to be reported on the same uplink subframe, and if the first UCI is the periodic CSI and the periodic CSI includes the CSI of the first reporting type and the CSI of the second reporting type, the CSI of the second reporting type is discarded, and only the CSI of the first reporting type and the second UCI are reported on the uplink subframe.

Optionally, the second UCI in the step may be hybrid automatic repeat request-acknowledgment information HARQ-ACK and a scheduling request SR or the first UCI may be periodic channel state information CSI and a scheduling request SR. A subframe configured at a high layer and used for transmitting a scheduling request may transmit periodic channel state information CSI, hybrid automatic repeat request-acknowledgment information HARQ-ACK and the scheduling request at the same time. In this case, the scheduling request may be classified as the first UCI or the second UCI. In the embodiment of the present invention, preferably, the scheduling request is classified as the second UCI, that is, on the subframe configured at the high layer and used for transmitting the scheduling request, the first UCI is the periodic channel state information CSI, and the second UCI is the hybrid automatic repeat request-acknowledgment information HARQ-ACK and the scheduling request SR.

Optionally, in an embodiment, the first UCI may be the periodic CSI, and the second UCI may be the HARQ-ACK or may be the HARQ-ACK and the scheduling request SR. And the periodic CSI is from all or part of information in the periodic CSI corresponding to a first carrier, the first carrier corresponds to a downlink carrier, and when the periodic CSI of multiple downlink carriers all needs to be reported on a current subframe, priority of the periodic CSI corresponding to the first carrier is the highest. Optionally, the priority of the periodic CSI may be sorted according to the following rules: The periodic CSI with a highest-priority CSI reporting type has the highest priority, and if the reporting types of the periodic CSI of multiple downlink carriers are the same, the periodic CSI of a downlink carrier with a smallest carrier index has the highest priority. Optionally, the priority of the periodic CSI may further be sorted according to the following rules: The priority of the periodic CSI of the downlink carrier not associated with an uplink carrier is higher than that of the periodic CSI of the downlink carrier associated with the uplink carrier; among the periodic CSI of multiple downlink carriers not associated with uplink carriers, the periodic CSI of the highest-priority CSI reporting type has the highest priority; and if the reporting types of the periodic CSI of multiple downlink carriers not associated with uplink carriers are the same, the periodic CSI of the downlink carrier with a smallest carrier index has the highest priority, where, the downlink carrier not associated with the uplink carrier indicates that, among uplink carriers configured for the UE, no uplink carrier is associated with the downlink carrier SIB-2.

The UE may obtain the resource occupied by the first UCI and obtain the resource occupied by the second UCI in one of the following manners. The resource may be the number of modulation symbols or the number of encoded bits, that is, the step may be: obtaining the number of modulation symbols occupied by the first UCI and the number of modulation symbols occupied by the second UCI, or obtaining the number of encoded bits occupied by the first UCI and the number of encoded bits occupied by the second UCI. Taking that the resource is the number of modulation symbols as an example and assuming that the first UCI is the periodic CSI and the second UCI is the HARQ-ACK, the following describes manners for the UE to obtain the resource occupied by the first UCI and the resource occupied by the second UCI in detail.

Figure 4:
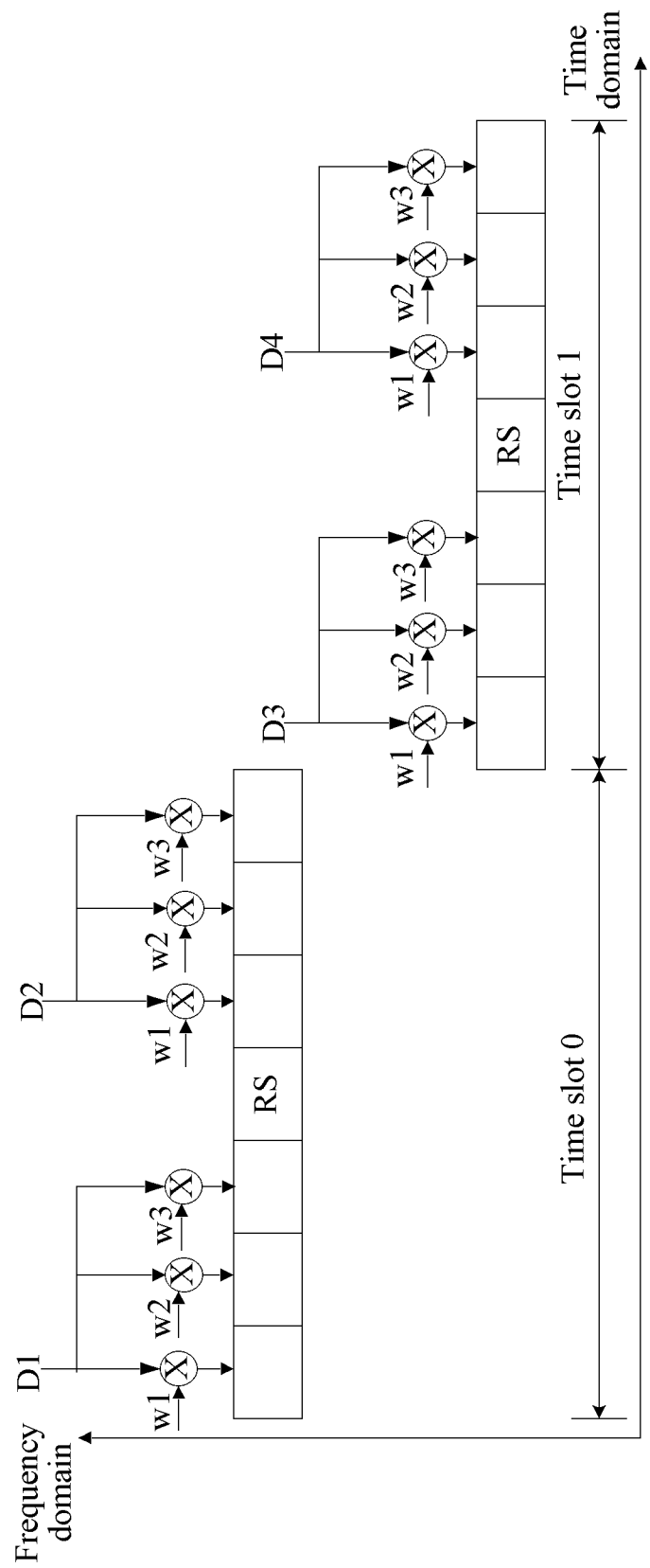
FIG. 4 is a schematic diagram of a modified PUCCH format.
Figure 5:
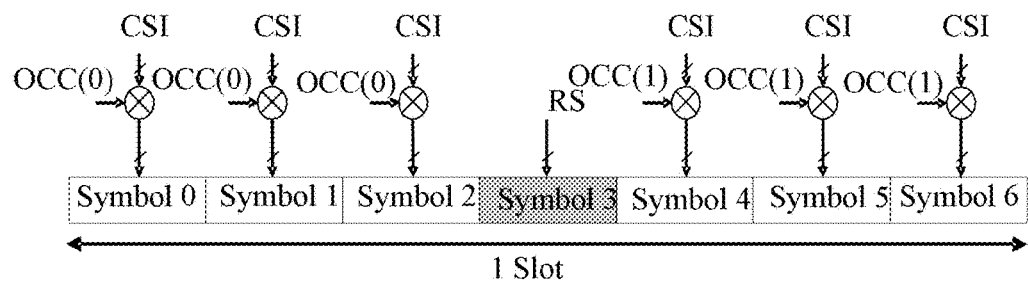
FIG. 5 is a schematic diagram of a modified PUCCH format.

Manner 1:

The number of modulation symbols occupied by the periodic CSI satisfies $Q'_{CSI}=Q'$, and the number of modulation symbols occupied by the HARQ-ACK satisfies $Q'_{HARQ-ACK}=|Q'*(O_{HARQ-ACK}/(O_{CSI}+O_{HARQ-ACK}))*\beta_{offset}|$ where, Q' is capacity of a physical uplink channel, and for example, when the physical uplink channel is PUCCH (Physical Uplink Control Channel, physical uplink control channel) format 3, capacity of the physical uplink channel Q' may satisfy Q'=24; when the physical uplink channel is a format of modified PUCCH format 3 shown in FIG. 4, Q'=48; when the physical uplink channel is modified PUCCH format 3 shown in FIG. 5, Q'=72; and when the physical uplink channel is the PUCCH format 3 occupying multiple RBs (Resource Block), $Q'=24*N_{PRB}$, and $M_{PRB}$ is the number of RBs allocated to the physical uplink channel. $\beta_{offset}$ is a value configured semi-statically by high-layer signaling or a preset value, and if the periodic CSI is the first reporting type, $\beta_{offset}=1$. $O_{HARQ-ACK}$ is the total number of information bits of the HARQ-ACK to be transmitted. $O_{CSI}$ is the total number of information bits of the periodic CSI to be transmitted, and here the total number of information bits of the periodic CSI to be transmitted may be understood as the total number of information bits of the reported periodic CSI determined by the UE, that is, the number of information bits corresponding to the discarded CSI is not included.

It should be noted that, in this manner, when the second UCI is the hybrid automatic repeat request-acknowledgment information and the scheduling request SR, $O_{HARQ-ACK}$ is the sum of the number of information bits of the HARQ-ACK to be transmitted and the number of information bits of the scheduling request, and generally the number of information bits of the scheduling request is 1.

Manner 2:

The number of modulation symbols occupied by the periodic CSI satisfies $Q'_{CSI}=Q'$; if the periodic CSI is the first reporting type, the number of modulation symbols occupied by the HARQ-ACK satisfies $Q'_{HARQ-ACK}=Q'*(O_{HARQ-ACK}/(O_{CSI}+O_{HARQ-ACK}))|$, and if the periodic CSI is the second reporting type, the number of modulation symbols occupied by the HARQ-ACK satisfies $Q'_{HARQ-ACK}=|(2/3)*Q'*(O_{HARQ-ACK}/O_{CSI})|$, where, the meanings of $Q'$, $O_{HARQ-ACK}$ and $O_{CSI}$ are consistent with those in Manner 1, and are not repeatedly described in detail herein.

Manner 3:

The number of modulation symbols occupied by the periodic CSI satisfies $Q'_{CSI}=Q'$ and the number of modulation symbols occupied by the HARQ-ACK satisfies $Q'_{HARQ-ACK}=|(O_{HARQ-ACK}*((M_{SC}^{PUCCH}*N_{symb}^{PUCCH})/V_{SF})*\beta_{offset})/O_{CSI}|$, where $M_{SC}^{PUCCH}$ is the number of subcarriers allocated to the physical uplink channel, $M_{SC}^{PUCCH}=12*N_{PRB}$, $N_{PRB}$ is the number of RBs allocated to the physical uplink channel; $N_{symb}^{PUCCH}$ is the number of time domain symbols, used for transmitting the UCI, of the physical uplink channel, and $N_{symb}^{PUCCH}$ may satisfy $N_{symb}^{PUCCH}=(2 \cdot N_{symb}^{UL}-N_{DMRS}-N_{SRS})$; $N_{symb}^{UL}$ is the number of time domain symbols occupied by the physical uplink channel in a time slot, the value of $N_{symb}^{UL}$ is 7 in a case of normal cyclic prefix (Cyclic Prefix, CP), the value of $N_{symb}^{UL}$ is 6 in a case of extension CP, $N_{DMRS}$ is the number of time domain SC-FDMA symbols used by a subframe of the physical uplink channel to transmit a DMRS demodulation pilot signal, and for example, when the physical uplink channel is the PUCCH format 3, the value of $N_{DMRS}$ is 4; when the physical uplink control channel is of a structure shown in FIG. 4 or FIG. 5, the value of $N_{DMRS}$ is 2, the value of $N_{SRS}$ is the number of time domain SC-FDMA symbols used by the subframe to transmit an SRS (Sounding Reference Signal, Sounding Reference Signal); when an SRS is transmitted on a current subframe, the value of $N_{SRS}$ is 1; when no SRS is transmitted on the current subframe, the value of $N_{SRS}$ is 0; $V_{SF}$ is the value of a spread spectrum coefficient, and for example, when the physical uplink channel is PUCCH format 3, the value of $V_{SF}$ is 5, and when the physical uplink channel is of a structure shown in FIG. 4 or FIG. 5, the values of $V_{SF}$ are 3 and 2, respectively. The meanings of $\beta_{offset}$, $O_{HARQ-ACK}$ and $O_{CSI}$ are consistent with those in Manner 1, and are not repeatedly described in detail herein.

Manner 4:

The number of modulation symbols occupied by the periodic CSI satisfies $Q'_{CSI}=Q'$ and the number of modulation symbols occupied by the HARQ-ACK satisfies $Q'_{HARQ-ACK}=N_{symb}^{HARQ-ACK}*M_{SC}^{PUCCH}$, where $N_{symb}^{HARQ-ACK}$ is the number of time domain SC-FDMA symbols used for transmitting the HARQ-ACK, which may be a value semi-statically notified by a high layer, and may also be a preset value, for example, the value is 4. The value of $M_{SC}^{PUCCH}$ is consistent with that in Manner 3, and is not repeatedly described in detail herein. The meanings of $Q'$, $O_{HARQ-ACK}$ and $O_{CSI}$ are consistent with those in Manner 1, and are not repeatedly described in detail herein.

It should be understood that, in the foregoing four manners, all the numbers of modulation symbols occupied by the periodic CSI satisfy $Q'_{CSI}=Q'$. In this case, when the first UCI and the second UCI are mapped to the physical uplink channel at the same time for transmission, the second UCI punctures (Puncture) the first UCI.

It should be understood that, when the resource in step 301 is the number of encoded bits, corresponding to the four manners in step 301, there may be two manners of obtaining the number of encoded bits of the first UCI and the number of encoded bits of the second UCI. Manner 1: Respectively multiply the numbers $Q'_{CSI}$ and $Q'_{HARQ-ACK}$ of modulation symbols in each manner by the modulation order $Q_m$ corresponding to a modulation manner of the UCI, so as to obtain the number of encoded bits corresponding to the first UCI and the number of encoded bits corresponding to the second UCI. Manner 2: Respectively replace the numbers $Q'_{CSI}$ and $Q'_{HARQ-ACK}$ of modulation symbols in each manner with the numbers $Q_{CSI}$ and $Q_{ACK}$ of encoded bits, and at the same time, replace $Q'$ with $Q$, where $Q$ is also the capacity of the physical uplink channel, and in this case, the channel capacity may be the number of encoded bits corresponding to bearable UCI. For example, when the physical uplink channel is PUCCH format 3, capacity $Q$ of the physical uplink channel may satisfy $Q=24*Q_m$; when the physical uplink channel is the format of the modified PUCCH format 3 shown in FIG. 4, $Q=48*Q_m$; when the physical uplink channel is the modified PUCCH format 3 shown in FIG. 5, $Q=72*Q_m$; and when the physical uplink channel is PUCCH format 3 occupying multiple RBs (Resource Block), $Q=24*N_{PRB}*Q_m$, and $N_{PRB}$ is the number of RBs allocated to the physical uplink channel. It should be noted that, the RB in the embodiment of the present invention may also be called a PRB.

Step 302: The UE performs channel encoding on the first UCI according to the resource occupied by the first UCI to obtain an encoded bit sequence of the first UCI, and performs channel encoding on the second UCI according to the resource occupied by the second UCI to obtain an encoded bit sequence of the second UCI.

If the resource in step 301 is the number of modulation symbols, before performing channel encoding on the first UCI and the second UCI, the UE may calculate the number of encoded bits of the first UCI according to the number of modulation symbols occupied by the first UCI and obtained in step 301, and calculate the number of encoded bits of the second UCI according to the number of modulation symbols occupied by the second UCI and obtained in step 301, where specifically, the number of encoded bits corresponding to the first UCI may satisfy $Q_{CSI}=Q'_{CSI}*Q_m$, the number of encoded bits corresponding to the second UCI may satisfy $Q_{ACK}=Q'_{HARQ-ACK}*Q_m$, and then perform channel encoding according to the number of encoded bits of the first UCI and the number of encoded bits of the second UCI to obtain the encoded bit sequence, $q_0^{CSI}, q_1^{CSI}, q_2^{CSI}, \ldots, q_{Q_{CSI}-1}^{CSI}$, of the first UCI and the encoded bit sequence, $q_0^{ACK}, q_1^{ACK}, q_2^{ACK}, \ldots, q_{Q_{ACK}-1}^{ACK}$, of the second UCI.

If the resource in step 301 is the number of encoded bits, in step 302, channel encoding may be directly performed on the first uplink control information UCI according to the number of encoded bits of the first UCI obtained in step 301, and channel encoding may be performed on the second UCI according to the number of encoded bits of the second UCI obtained in step 301 to obtain the encoded bit sequence, $q_0^{CSI}, q_1^{CSI}, q_2^{CSI}, \ldots, q_{Q_{CSI}-1}^{CSI}$, of the first UCI and the encoded bit sequence, $q_0^{ACK}, q_1^{ACK}, q_2^{ACK}, \ldots, q_{Q_{ACK}-1}^{ACK}$, of the second UCI.

For example, the channel encoding method in step 302 may be: performing independent channel encoding on the first UCI and the second UCI, specifically: when the total number of information bits of the first UCI to be transmitted is less than or equal to 11, using Reed-Muller RM (Reed-Muller) (32, O) code to encode the first UCI; when the total number of information bits of the first UCI to be transmitted is greater than 11, using double Reed-Muller RM (Reed-Muller) (32, O) codes to encode the first UCI or using tail biting convolutional code TBCC (Tail biting convolutional code) to perform channel encoding on the first UCI; when the total number of information bits of the second UCI to be transmitted is less than or equal to 11, using the Reed-Muller RM (Reed-Muller) (32, O) code to encode the second UCI, and when the total number of information bits of the second UCI to be transmitted is greater than 11, using the double Reed-Muller RM (Reed-Muller) (32, O) code to encode the second UCI or using the tail biting convolutional code TBCC (Tail biting convolutional code) to perform channel encoding on the second UCI.

Step 303: The UE maps the encoded bit sequence of the first UCI and the encoded bit sequence of the second UCI to a physical uplink channel, so as to transmit to a base station.

Step 303 may be implemented by using the following three steps.

Step 303-1: The UE converts the encoded bit sequence of the first UCI into an encoded vector sequence of the first UCI, and converts the encoded bit sequence of the second UCI into an encoded vector sequence of the second UCI.

The UE converts the encoded bit sequence, $q_0^{CSI}, q_1^{CSI}, q_2^{CSI}, \ldots, q_{Q_{CSI}-1}^{CSI}$, of the first UCI and the encoded bit sequence $q_0^{ACK}, q_1^{ACK}, q_2^{ACK}, \ldots, q_{Q_{ACK}-1}^{ACK}$, of the second UCI into an encoded vector sequence, $\underline{q}_0^{CSI}, \underline{q}_1^{CSI}, \underline{q}_2^{CSI}, \ldots, \underline{q}_{Q'_{CSI}-1}^{CSI}$, of the first UCI and an encoded vector sequence, $\underline{q}_0^{ACK}, \underline{q}_1^{ACK}, \underline{q}_2^{ACK}, \ldots, \underline{q}_{Q'_{ACK}-1}^{ACK}$, of the second UCI, respectively, where $Q'_{ACK}=Q_{ACK}/Q_m$ and $Q'_{CSI}=Q_{CSI}/Q_m$.

Step 303-1-a: The method for converting the encoded bit sequence, $q_0^{CSI}, q_1^{CSI}, q_2^{CSI}, \ldots q_{Q_{CSI}-1}^{CSI}$, of the first UCI into the encoded vector sequence, $\underline{q}_0^{CSI}, \underline{q}_1^{CSI}, \underline{q}_2^{CSI}, \ldots, \underline{q}_{Q'_{CSI}-1}^{CSI}$, of the first UCI may be implemented according to the following pseudo code:

---
Set i ,k to 0
while i < $Q_{CSI}$
$\underline{q}_k^{CSI} = [q_i^{CSI} \ldots q_{i+Q_m-1}^{CSI}]^T$
i = i + $Q_m$
k = k + 1
end while

---

Step 303-1-b: The method for converting the encoded bit sequence, $q_0^{ACK}, q_1^{ACK}, q_2^{ACK}, \ldots, q_{Q_{ACK}-1}^{ACK}$, of the second UCI into the encoded vector sequence, $\underline{q}_0^{ACK}, \underline{q}_1^{ACK}, \underline{q}_2^{ACK}, \ldots, \underline{q}_{Q'_{ACK}-1}^{ACK}$ of the second UCI may be implemented according to the following pseudo code:

---
Set i ,k to 0
while i < $Q_{ACK}$
$\underline{q}_k^{ACK} = [q_i^{ACK} \ldots q_{i+Q_m-1}^{ACK}]^T$
i = i + $Q_m$
k = k + 1
end while

---

Step 303-2: Perform channel interleaving on the encoded vector sequence of the first UCI and the encoded vector sequence of the second UCI, so as to obtain an encoded bit sequence of the UCI.

In this step, the UE performs channel interleaving on the encoded vector sequence, $\underline{q}_0^{CSI}, \underline{q}_1^{CSI}, \underline{q}_2^{CSI}, \ldots, \underline{q}_{Q'_{CSI}-1}^{CSI}$, of the first UCI and the encoded vector sequence, $\underline{q}_0^{ACK}, \underline{q}_1^{ACK}, \underline{q}_2^{ACK}, \ldots, \underline{q}_{Q'_{ACK}-1}^{ACK}$, of the second UCI.

Specifically, the UE performs channel interleaving on the encoded vector sequence, $\underline{q}_0^{CSI}, \underline{q}_1^{CSI}, \underline{q}_2^{CSI}, \ldots, \underline{q}_{Q'_{CSI}-1}^{CSI}$, of the first UCI and the encoded vector sequence, $\underline{q}_0^{ACK}, \underline{q}_1^{ACK}, \underline{q}_2^{ACK}, \ldots, \underline{q}_{Q'_{ACK}-1}^{ACK}$, of the second UCI, that is, writes the encoded vector sequence, $\underline{q}_0^{CSI}, \underline{q}_1^{CSI}, \underline{q}_2^{CSI}, \ldots, \underline{q}_{Q'_{CSI}-1}^{CSI}$, of the first UCI and the encoded vector sequence, $\underline{q}_0^{ACK}, \underline{q}_1^{ACK}, \underline{q}_2^{ACK}, \ldots, \underline{q}_{Q'_{ACK}-1}^{ACK}$, of the second UCI into the following matrix:

$$\begin{bmatrix} \underline{y}_0 & \underline{y}_1 & \underline{y}_2 & L & \underline{y}_{C_{max}-1} \\ \underline{y}_{C_{max}} & \underline{y}_{C_{max}+1} & \underline{y}_{C_{max}+2} & L & \underline{y}_{2C_{max}-1} \\ M & M & M & O & M \\ \underline{y}_{(R'_{max}-1)C_{max}} & \underline{y}_{(R'_{max}-1)\times C_{max}+1} & \underline{y}_{(R'_{max}-1)\times C_{max}+2} & L & \underline{y}_{(R'_{max}\times C_{max}-1)} \end{bmatrix}$$

If the physical uplink channel is PUCCH format 3, $C_{mux}=2$ in the matrix; if the physical uplink channel is the modified PUCCH format 3 shown in FIG. 4, $C_{mux}=4$ in the matrix; if the physical uplink channel is the modified PUCCH format 3 shown in FIG. 5, $C_{mux}=6$ in the matrix; and $R'_{mux}=M_{SC}^{PUCCH}$ in the matrix, where $M_{SC}^{PUCCH}$ is the number of subcarriers allocated to the physical uplink channel, for example, $R'_{mux}=M_{SC}^{PUCCH}=12$, and for detailed description, reference may be made to step 301.

Specifically, the writing the encoded vector sequence, $\underline{q}_0^{CSI}, \underline{q}_1^{CSI}, \underline{q}_2^{CSI}, \ldots, \underline{q}_{Q'_{CSI}-1}^{CSI}$, of the first UCI and the encoded vector sequence, $\underline{q}_0^{ACK}, \underline{q}_1^{ACK}, \underline{q}_2^{ACK}, \ldots, \underline{q}_{Q'_{ACK}-1}^{ACK}$, of the second UCI into the matrix may be implemented in the following three substeps.

Step 303-2-a: First write the encoded vector sequence, $\underline{q}_0^{CSI}, \underline{q}_1^{CSI}, \underline{q}_2^{CSI}, \ldots, \underline{q}_{Q'_{CSI}-1}^{CSI}$, of the first UCI into the matrix, which may be specifically implemented according to the following pseudo code:

---
Set i, k to 0
while k < $Q'_{CSI}$
$\underline{y}_i = \underline{q}_k^{CSI}$
k = k + 1
i = i + 1
end while

---

Step 303-2-b: Then write the encoded vector sequence, $\underline{q}_0^{ACK}, \underline{q}_1^{ACK}, \underline{q}_2^{ACK}, \ldots, \underline{q}_{Q'_{ACK}-1}^{ACK}$, of the second UCI into a corresponding column, indicated by a column set, in the matrix, where if the physical uplink channel is PUCCH format 3, the column set is {0, 1}; if the physical uplink channel is the modified PUCCH format 3 shown in FIG. 4, the column set is {0, 3, 2, 1}; and if the physical uplink channel is the modified PUCCH format 3 shown in FIG. 5, the column set is {0, 5, 4, 1, 2, 3}, which may be specifically implemented in one of the following manners.

Manner 1: Write the encoded vector sequence, $\underline{q}_0^{ACK}, \underline{q}_1^{ACK}, \underline{q}_2^{ACK}, \ldots, \underline{q}_{Q'_{ACK}-1}^{ACK}$, of the second UCI into the matrix according to the following pseudo code:

---
Set i, j to 0.
Set r to R'$_{mux}$−1
While i < $Q'_{ACK}$
$c_{ACK}$ = ColumnSet(j)
$\underline{y}_{r \times C_{mux}+c_{ACK}} = \underline{q}_i^{ACK}$
i = i + 1
r = R'$_{mux}$−1−⌊i/ length(ColumnSet(j))⌋
j = j mod length(ColumnSet(j))
end while

---

Manner 2: Write the encoded vector sequence, $\underline{q}_0^{ACK}, \underline{q}_1^{ACK}, \underline{q}_2^{ACK}, \ldots, \underline{q}_{Q'_{ACK}-1}^{ACK}$, of the second UCI into the matrix according to the following pseudo code:

```
Set i, j to 0.
Set r to R'_mux-1
While i < Q'_ACK
    c_ACK = ColumnSet(j)
    y_r×C_mux+c_ACK = q_i^ACK
    i = i + 1
    r = R'_mux-1-2*⌊i/ length(ColumnSet(j))⌋
    j = j mod length(ColumnSet(j))
end while
```

In manner 2, the second UCI can be mapped to a frequency domain resource more discretely, thereby obtaining more frequency diversity gains, but the manner is slightly more complicated, and if the number of encoded bits of the second UCI is very large, the encoded bits of the second UCI may be truncated.

Step 303-2-c: Read encoded bits of each column in the matrix in order successively to obtain the encoded bit sequence, $h_0, h_1, h_2, \ldots, h_{Q_{CSI}+Q_{ACK}-1}$, of the UCI.

In this step, the encoded bits of each column in the matrix are read successively in a column-by-column manner, namely, in a manner of first reading the first column, and then reading the second column after the first column is read.

Step 303-3: Map the encoded bit sequence of the UCI to the physical uplink channel, so as to transmit to the base station.

Figure 6:
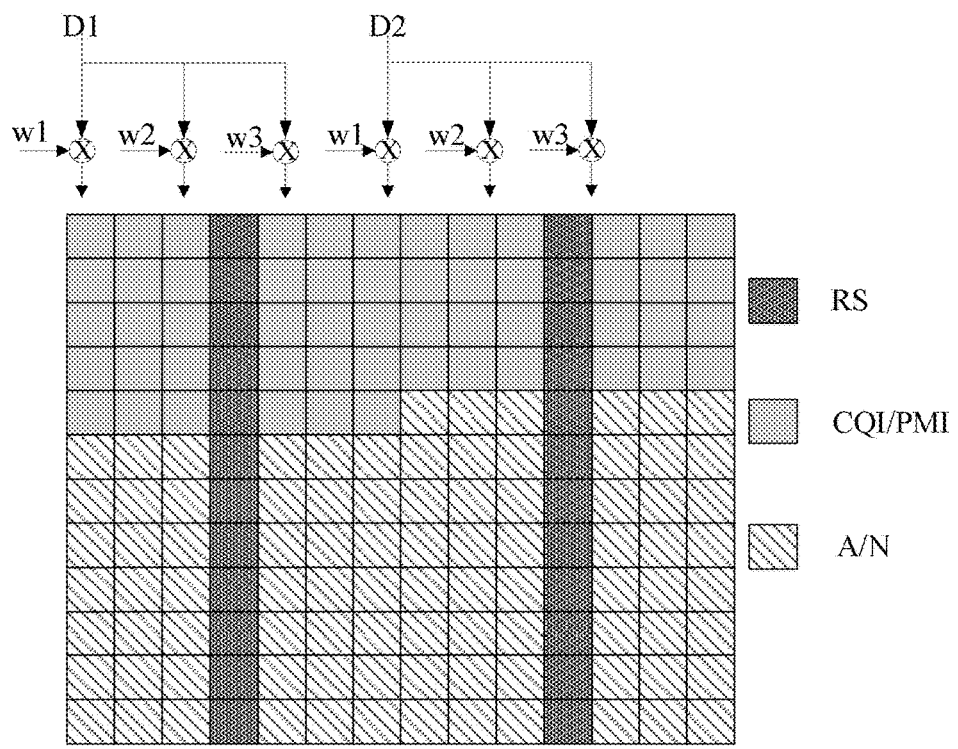
FIG. 6 is a schematic diagram of resource mapping of UCI.
Figure 7:
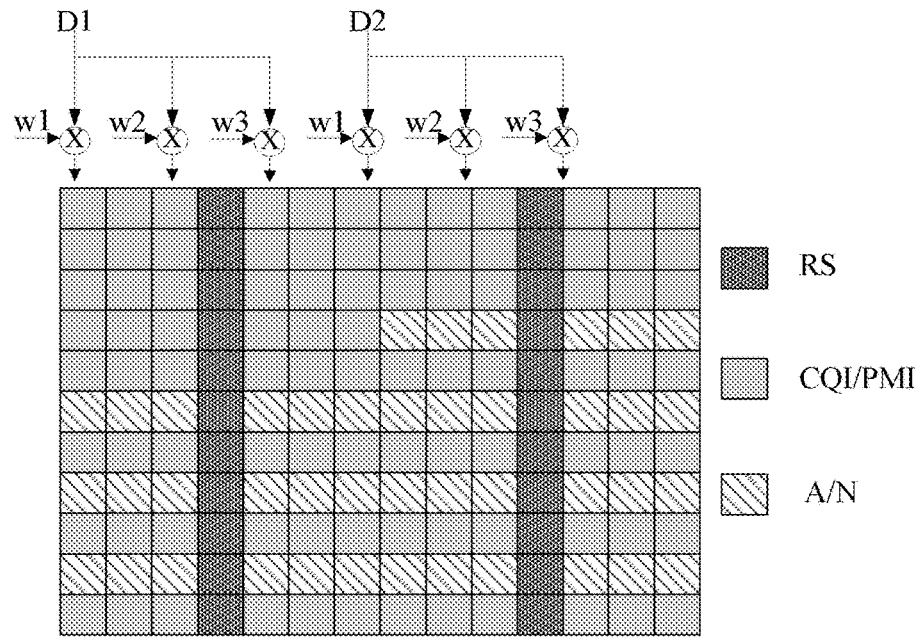
FIG. 7 is a schematic diagram of resource mapping of UCI.

For example, when the physical uplink channel is the modified PUCCH format 3 shown in FIG. 4, through the step, when Manner 1 and Manner 2 are used in step 303-2-b, the schematic diagrams of resource mapping of the first UCI and the second UCI are shown in FIG. 6 and FIG. 7, respectively.

Step 304: A base station obtains the resource occupied by the first UCI and obtains the resource occupied by the second UCI.

In step 304, a specific method for the base station to obtain the resource occupied by the first UCI and the resource occupied by the second UCI is consistent with that in step 301, and therefore details are not repeatedly described herein to avoid repetition.

Step 305: The base station performs channel decoding on the first UCI according to the resource occupied by the first UCI to obtain the first UCI transmitted by a UE, and performs channel decoding on the second UCI according to the resource occupied by the second UCI to obtain the second UCI transmitted by the UE.

In step 305, the base station may, according to the resource occupied by the first UCI and the resource occupied by the second UCI, which are obtained in step 304, and according to the method, described in step 303, for the UE to map the encoded bit sequence of the first UCI and the encoded bit sequence of the second UCI to the physical uplink channel for transmission to the base station, perform channel decoding on the first UCI, and perform channel decoding on the second UCI.

Step 305 may further be implemented in the following two steps.

Step 305-1: The base station separates modulation symbols corresponding to the first UCI on the physical uplink channel according to the resource occupied by the first UCI, and separates modulation symbols corresponding to the second UCI on the physical uplink channel according to the resource occupied by the second UCI.

In step 305-1, the base station may, according to the resource occupied by the first UCI and the resource occupied by the second UCI, which are obtained in step 304, and according to the method, described in step 303, for the UE to map the encoded bit sequence of the first UCI and the encoded bit sequence of the second UCI to the physical uplink channel to transmit to the base station, separate the modulation symbols corresponding to the first UCI on the physical uplink channel and separate the modulation symbols corresponding to the second UCI.

Step 305-2: The base station performs channel decoding on the first UCI according to the modulation symbols corresponding to the first UCI to obtain the first UCI transmitted by the user equipment, and performs channel decoding on the second UCI according to the modulation symbols corresponding to the second UCI to obtain the second UCI transmitted by the user equipment.

In the embodiment of the present invention, independent encoding is performed on the first UCI and the second UCI, and resources corresponding to the first UCI and the second UCI may be allocated according to performance goals and requirements of different UCI, which ensures that different UCI reaches respective performance goals and requirements, and meanwhile, avoids increasing transmission power according to the UCI with the highest performance requirement, thereby improving power utilization efficiency.

Embodiment 2

In Embodiment 1, a UE maps first UCI and second UCI to a physical uplink channel at the same time for transmission, and the second UCI punctures the first UCI. In Embodiment 2, in a manner of rate matching on the first UCI according to the resource occupied by the second UCI, the first UCI and the second UCI are mapped to the physical uplink channel at the same time for transmission.

Two differences exist between Embodiment 2 and Embodiment 1:

1. The resource occupied by the first UCI in each manner in step 301 in Embodiment 1 satisfies $Q'_{CSI}=Q'-Q'_{HARQ-ACK}$.

2. When channel interleaving is performed on the encoded vector sequence, $q_0^{CSI}, q_1^{CSI}, q_2^{CSI}, \ldots, q_{Q'_{CSI}-1}^{CSI}$, of the first UCI and the encoded vector sequence, $q_0^{ACK}, q_1^{ACK}, q_2^{ACK}, \ldots, q_{Q'_{ACK}-1}^{ACK}$, of the second UCI in step 303-2 in Embodiment 1, the encoded vector sequence, $q_0^{ACK}, q_1^{ACK}, q_2^{ACK}, \ldots, q_{Q'_{ACK}-1}^{ACK}$, of the second UCI needs to be written into a matrix first, and then the encoded vector sequence, $q_0^{CSI}, q_1^{CSI}, q_2^{CSI}, \ldots, q_{Q'_{CSI}-1}^{CSI}$, of the first UCI is written into the matrix, so step 303-2 in Embodiment 1 may be implemented specifically in the following manner.

Step 303-2-a': Write the encoded vector sequence, $q_0^{ACK}, q_1^{ACK}, q_2^{ACK}, \ldots, q_{Q'_{ACK}-1}^{ACK}$, of the second UCI into a corresponding column, indicated by a column set, in the matrix, where if the physical uplink channel is PUCCH format 3, the column set is {0, 1}; if the physical uplink channel is the modified PUCCH format 3 shown in FIG. 4, the column set is {0, 3, 2, 1}; and if the physical uplink channel is the modified PUCCH format 3 shown in FIG. 5, the column set is {0, 5, 4, 1, 2, 3}.

A specific implement method of this step is consistent with that of step 303-2-b in Embodiment 1, and therefore details are not repeatedly described herein to avoid repetition.

Step 303-2-b': Then, write the encoded vector sequence, $q_0^{CSI}, q_1^{CSI}, q_2^{CSI}, \ldots, q_{Q'_{CSI}-1}^{CSI}$, of the first UCI into the matrix, which may be specifically implemented according to the following pseudo code:

```
Set i ,k to 0
while k < Q'_CSI
    if y_i is not assigned to HARQ-ACK symbols
        y_i = q_k^CSI
        k = k + 1
    end if
    i = i + 1
end while
```

For other steps in Embodiment 2, reference may be made to Embodiment 1, and details are not repeatedly described.

In the embodiment of the present invention, independent encoding is performed on the first UCI and the second UCI, and resources corresponding to the first UCI and the second UCI may be allocated according to performance goals and requirements of different UCI, which ensures that different UCI reaches respective performance goals and requirements, and meanwhile, avoids increasing transmission power according to the UCI with the highest performance requirement, thereby improving power utilization efficiency.

Embodiment 3

In Embodiment 1 and Embodiment 2, the second UCI is mapped to all time domain SC-FDMA symbols for transmission. In Embodiment 3, the second UCI is only mapped to a part of time domain SC-FDMA symbols for transmission, which is applicable to a scenario in which the number of encoded bits of the second UCI to be transmitted is small and a physical uplink channel transmitting UCI is of a structure shown in FIG. 4 or FIG. 5.

Compared with Embodiment 1 and Embodiment 2, a difference of Embodiment 3 lies in different column sets in step 303-2. In Embodiment 3, if the physical uplink channel is the modified PUCCH format 3 shown in FIG. 4, the column set is {1, 2}; and if the physical uplink channel is the modified PUCCH format 3 shown in FIG. 5, the column set is {2, 3} or {1, 4} or {1, 4, 3, 2}.

For other steps in Embodiment 3, reference may be made to Embodiment 1, and details are not repeatedly described.

Embodiment 4

In Embodiment 4, second UCI is only mapped to a part of time domain SC-FDMA symbols for transmission, which is only applicable to a scenario in which the number of encoded bits of the second UCI to be transmitted is small and a physical uplink channel transmitting UCI is of a structure shown in FIG. 4.

A difference of Embodiment 4 from Embodiment 1 and Embodiment 2 only lies in a different column set in step 303-2, that is, a specific implementation method for writing the encoded vector sequence, $q_0^{ACK}, q_1^{ACK}, q_2^{ACK}, \ldots, q_{Q'_{ACK}-1}^{ACK}$, of the second UCI into a matrix is different. In Embodiment 4, the column set is {0, 2}, and the encoded vector sequence, $q_0^{ACK}, q_1^{ACK}, q_2^{ACK}, \ldots, q_{Q'_{ACK}-1}^{ACK}$, of the second UCI is written into the matrix in the following manner:

```
Set i, j to 0.
Set r to R'_mux-1
While i < Q'_ACK
    c_ACK = ColumnSet (j) + j mod 2
    y_{r×C_mux+c_ACK} = q_i^ACK
    i = i + 1
    r = R'_mux-1-⌊i/length(ColumnSet(j))⌋
```

```
    j = j mod length(ColumnSet(j))
end while
```

Figure 8:
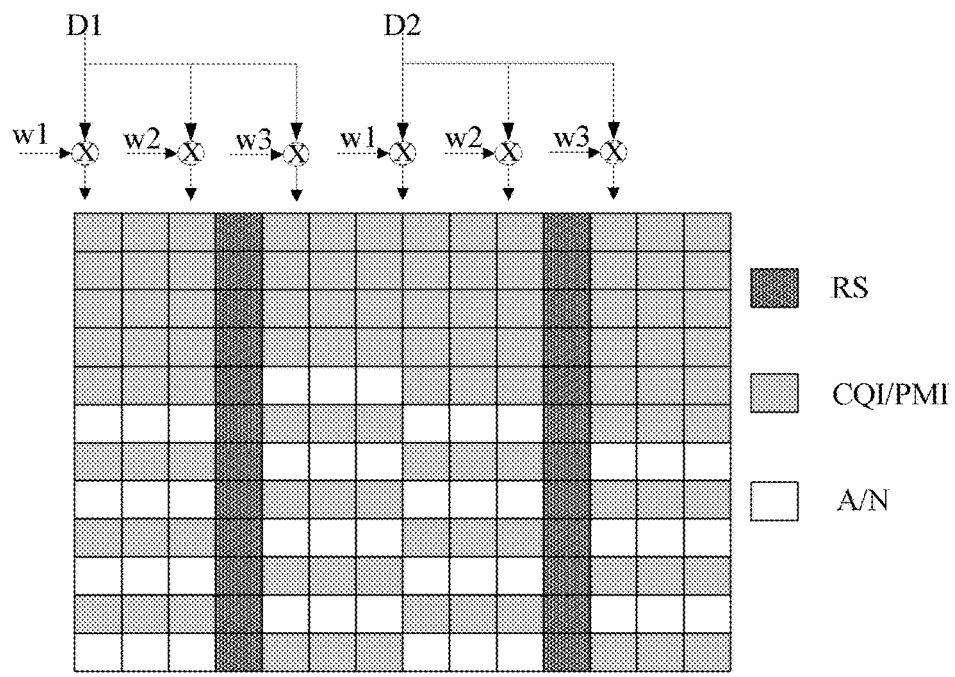
FIG. 8 is a schematic diagram of resource mapping of UCI.

In Embodiment 4, a schematic diagram of resource mapping of the first UCI and the second UCI is shown in FIG. 8.

For other steps in Embodiment 4, reference may be made to Embodiment 1, and details are not repeatedly described.

Embodiment 5

Figure 9:
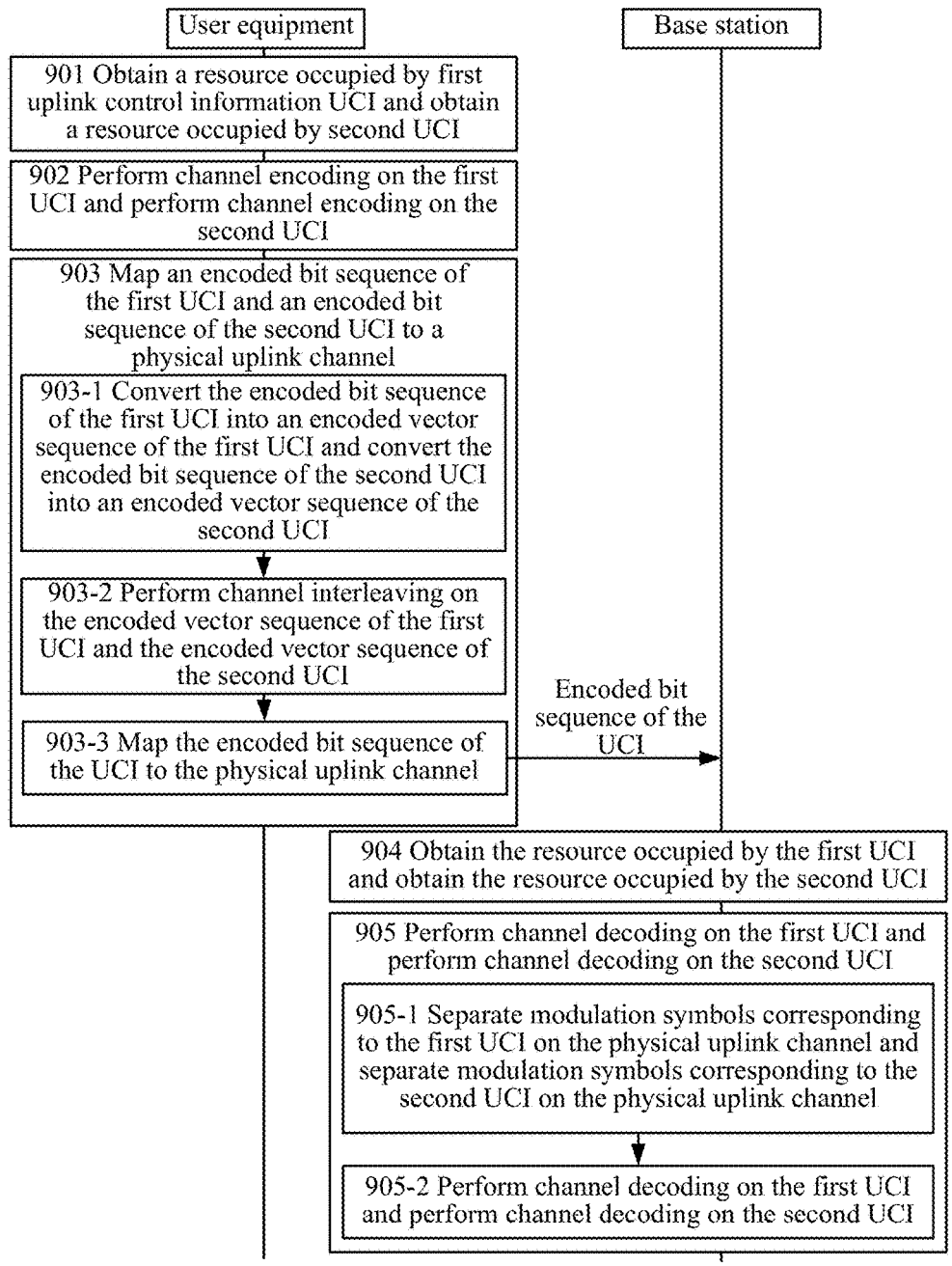
FIG. 9 is a schematic flow chart of a method for transmitting control information according to another embodiment of the present invention.

Embodiment 5 is mainly applicable to a scenario in which a physical uplink channel transmitting UCI is a periodic PUSCH. FIG. 9 is a schematic flow chart of a method for transmitting control information according to another embodiment of the present invention.

The following describes the embodiment of the present invention in detail with reference to FIG. 9.

Step 901: A UE obtains a resource occupied by first UCI and obtains a resource occupied by second UCI.

For example, the first UCI may be periodic CSI, and the second UCI may be HARQ-ACK. The periodic CSI may be of a first reporting type and/or a second reporting type. The resource may be the number of modulation symbols or the number of encoded bits.

In step 901, the UE may obtain the resource occupied by the first UCI and obtain the resource occupied by the second UCI in one of the following manners. It should be noted that, when the first UCI includes the CSI of the first reporting type and the CSI of the second reporting type, the obtaining the resource occupied by the first UCI includes: obtaining the resource occupied by the CSI of the first reporting type and the resource occupied by the CSI of the second reporting type. The following describes each manner in detail by taking that the resource is the number of modulation symbols as an example, and assuming that the first UCI is periodic CSI, the CSI of the first reporting type is an RI, the CSI of the second reporting type is a CQI/PMI, and the second UCI is HARQ-ACK.

Manner 1:

The number of modulation symbols occupied by the HARQ-ACK satisfies $$Q'_{HARQ-ACK} = \min\left(\left\lceil \frac{O_{HARQ-ACK} \times M_{sc}^{PUSCH} \times N_{symb}^{PUSCH} \times \beta_{offset}^{HARQ-ACK}}{O_{CQI-MIN}} \right\rceil, 4 \times M_{sc}^{PUSCH}\right);$$

the number of modulation symbols occupied by the CSI of the first reporting type satisfies $$Q'_{RI} = \left\lceil \frac{O_{RI} \times M_{sc}^{PUSCH} \times N_{symb}^{PUSCH} \times \beta_{offset}^{RI}}{O_{CQI-MIN}} \right\rceil,$$

and the number of modulation symbols occupied by the CSI of the second reporting type satisfies $Q'_{CQI/PMI} = N_{symb}^{PUSCH} \cdot M_{sc}^{PUSCH} - Q'_{RI}$, where $O_{HARQ-ACK}$ is the total number of information bits of the HARQ-ACK to be transmitted, $O_{RI}$ is the total number of information bits of the RI to be transmitted, $O_{CQI-MIN}$ is the total number of information bits of the CQI/PMI to be transmitted; values of $\beta_{offset}^{HARQ-ACK}$ and $\beta_{offset}^{RI}$ are values notified by high-layer RRC (Radio Resource Control, radio resource control) signaling and configured semi-statically by the high-layer signaling; $M_{SC}^{PUSCH}$ is the number of subcarriers allocated to the PUSCH channel, $M_{SC}^{PUCCH}=12*N_{PRB}$, $N_{PRB}$ is the number of RBs allocated to the PUSCH channel; $N_{symb}^{PUSCH}$ is the number of time domain symbols, used for transmitting the UCI, of the PUSCH channel, and $N_{symb}^{PUSCH}$ may satisfy $N_{symb}^{PUSCH}=(2\cdot N_{symb}^{UL}-2-N_{SRS})$, $N_{symb}^{UL}$ is the number of time domain SC-FDMA symbols occupied by the physical uplink channel in a time slot; in a normal CP case, the value of $N_{symb}^{UL}$ is 7; in an extension CP case, the value of $N_{symb}^{UL}$ is 6; the value of $N_{SRS}$ is the number of time domain SC-FDMA symbols, used for transmitting an SRS, of the subframe; when the current subframe has the SRS to be transmitted, the value of $N_{SRS}$ is 1, and when the current subframe has no SRS to be transmitted, the value of $N_{SRS}$ is 0. It should be noted that, if the first UCI only includes the CSI of the first reporting type, and when the number of modulation symbols occupied by the second UCI and the number of modulation symbols occupied by the CSI of the first reporting type are obtained, $O_{CQI-MIN}=O_{RI}$, $\beta_{offset}^{PUSCH}=1$.

Manner 2:

The number of modulation symbols occupied by the CSI of the first reporting type satisfies $$Q'_{RI} = \left\lceil \frac{O_{RI} \times M_{sc}^{PUSCH} \times N_{symb}^{PUSCH} \times \beta_{offset}^{RI}}{O_{CQI-MIN} + O_{RI}} \right\rceil;$$

the number of modulation symbols occupied by the HARQ-ACK satisfies $$Q'_{HARQ-ACK} = \min\left(\left\lceil \frac{O_{HARQ-ACK} \times M_{sc}^{PUSCH} \times N_{symb}^{PUSCH} \times \beta_{offset}^{HARQ-ACK}}{O_{CQI-MIN} + O_{RI}} \right\rceil, 4 \times M_{sc}^{PUSCH}\right) \text{ or}$$

$$Q'_{HARQ-ACK} = \min\left(\left\lceil \frac{O_{HARQ-ACK} \times M_{sc}^{PUSCH} \times N_{symb}^{PUSCH} \times \beta_{offset}^{HARQ-ACK}}{O_{CQI-MIN} + O_{RI}} \right\rceil, 8 \times M_{sc}^{PUSCH}\right),$$

and the number of modulation symbols occupied by the CSI of the second reporting type satisfies $Q'_{CQI}=N_{symb}^{PUSCH} \cdot M_{SC}^{PUSCH}-Q'_{RI}$. The meaning of each symbol is consistent with that in Manner 1, which is not repeatedly described herein.

Step 902: The UE performs channel encoding on the first UCI according to the resource occupied by the first UCI to obtain an encoded bit sequence of the first UCI, and performs channel encoding on the second UCI according to the resource occupied by the second UCI to obtain an encoded bit sequence of the second UCI.

It should be noted that, when the first UCI includes the CSI of the first reporting type and the CSI of the second reporting type, the performing channel encoding on the first UCI to obtain an encoded bit sequence of the first UCI includes: performing channel encoding on the CSI of the first reporting type to obtain the encoded bit sequence of the CSI of the first reporting type, and performing channel encoding on the CSI of the second reporting type to obtain the encoded bit sequence of the CSI of the second reporting type.

If the resource in step 901 is the number of modulation symbols, before performing channel encoding on the first UCI and the second UCI, the UE may calculate the number of encoded bits of the first UCI according to the number of modulation symbols occupied by the first UCI which is obtained in step 901, and calculate the number of encoded bits of the second UCI according to the number of modulation symbols occupied by the second UCI which is obtained in step 901. Channel encoding is performed on the first UCI according to the number of encoded bits of the first UCI to obtain the encoded bit sequence of the first UCI, and channel encoding is performed on the second UCI according to the number of encoded bits of the second UCI to obtain the encoded bit sequence of the second UCI.

When the first UCI includes the CSI of the first reporting type and the CSI of the second reporting type, the calculating the number of encoded bits of the first UCI includes: calculating the number of encoded bits of the CSI of the first reporting type, and calculating the number of encoded bits of the CSI of the second reporting type.

For example, if the first UCI includes the CSI of the first reporting type and the CSI of the second reporting type, the number of encoded bits of the CSI of the first reporting type satisfies $Q_{RI}=Q'_{RI}*Q_m$, and the number of encoded bits of the CSI of the second reporting type satisfies $Q_{CQI/PMI}=Q'_{CQI/PMI}*Q_m$. The number of encoded bits corresponding to the second UCI satisfies $Q_{ACK}=Q'_{HARQ-ACK}*Q_m$.

If the resource in step 901 is the number of encoded bits, channel encoding may be directly performed on the first UCI according to the number of encoded bits of the first UCI obtained in step 901 to obtain the encoded bit sequence of the first UCI, and channel encoding may be performed on the second UCI according to the number of encoded bits of the second UCI obtained in step 901 to obtain the encoded bit sequence of the second UCI.

When the first UCI includes the CSI of the first reporting type and the CSI of the second reporting type, the performing channel encoding on the first UCI according to the number of encoded bits of the first UCI to obtain the encoded bit sequence of the first UCI includes: performing channel encoding on the CSI of the first reporting type according to the number of encoded bits occupied by the CSI of the first reporting type to obtain the encoded bit sequence of the CSI of the first reporting type, performing channel encoding on the CSI of the second reporting type according to the number of encoded bits occupied by the CSI of the second reporting type to obtain the encoded bit sequence of the CSI of the second reporting type; multiplexing the encoded bit sequence of the CSI of the first reporting type and the encoded bit sequence of the CSI of the second reporting type, to obtain the encoded bit sequence of the first UCI.

Specifically, the encoded bit sequence of the CSI of the first reporting type is connected to the encoded bit sequence of the CSI of the second reporting type in series, and the encoded bit sequence of the CSI of the first reporting type is arranged in the front, so as to obtain a multiplexed encoded bit sequence, $q_0^{CSI}, q_1^{CSI}, q_2^{CSI}, \ldots, q_{Q_{RI}+Q_{CQI/PMI}-1}^{CSI}$, namely, the encoded bit sequence of the first UCI. The encoded bit sequence of the CSI of the first reporting type is first arranged in the front, which may avoid that the CSI of the first reporting type is punctured by the second UCI and can better protect the CSI of the first reporting type. It should be noted that, if the first UCI only includes the CSI of the first reporting type or the CSI of the second reporting type, the obtained multiplexed encoded bit sequence of the first UCI is $q_0^{CSI}, q_1^{CSI}, q_2^{CSI}, \ldots, q_{Q_{RI}-1}^{CSI}$ or $q_0^{CSI}, q_1^{CSI}, q_2^{CSI}, \ldots, q_{Q_{CQI/PMI}-1}^{CSI}$.

For a specific encoding method, reference may be made to step 302 in Embodiment 1, which is not repeatedly described herein.

Step 903: The UE maps the encoded bit sequence of the first UCI and the encoded bit sequence of the second UCI to a physical uplink channel, so as to transmit to a base station.

The step may be implemented in the following several steps.

Step 903-1: Convert the encoded bit sequence of the first UCI into an encoded vector sequence of the first UCI, and convert the encoded bit sequence of the second UCI into an encoded vector sequence of the second UCI.

Specifically, the encoded bit sequence of the first UCI is converted into an encoded vector sequence, $q_0^{CSI}, q_1^{CSI}, q_2^{CSI}, \ldots, q_{Q'_{CSI}-1}^{CSI}$, of the first UCI, and the encoded bit sequence of the second UCI is converted into an encoded vector sequence, $q_0^{ACK}, q_1^{ACK}, q_2^{ACK}, \ldots, q_{Q'_{ACK}-1}^{ACK}$, of the second UCI, where $Q'_{ACK}=Q_{ACK}/Q_m$ and $Q'_{CSI}=(Q_{RI}+Q_{CQI/PMI})/Q_m$.

Step 903-1-a: The method for converting the encoded bit sequence, $q_0^{CSI}, q_1^{CSI}, q_2^{CSI}, \ldots, q_{Q_{RI}+Q_{CQI/PMI}-1}^{CSI}$, of the first UCI into the encoded vector sequence, $q_0^{CSI}, q_1^{CSI}, q_2^{CSI}, \ldots, q_{Q'_{CSI}-1}^{CSI}$, of the first UCI may be implemented according to the following pseudo code:

---
Set i ,k to 0
while i < $Q_{RI}$ + $Q_{CQI/PMI}$
$\underline{q}_k^{CSI} = [q_i^{CSI} \ldots q_{i+Q_m-1}^{CSI}]^T$
i = i + $Q_m$
k = k + 1
end while
---

Step 903-1-b: For a method for converting the encoded bit sequence, $q_0^{ACK}, q_1^{ACK}, q_2^{ACK}, \ldots, q_{Q_{ACK}-1}^{ACK}$, of the second UCI into the encoded vector sequence, $\underline{q}_0^{ACK}, \underline{q}_1^{ACK}, \underline{q}_2^{ACK}, \ldots, \underline{q}_{Q'_{ACK}-1}^{ACK}$, of the second UCI, reference may be made to step 303-1-b in Embodiment 1, which is not repeatedly described.

Step 903-2: Perform channel interleaving on the encoded vector sequence of the first UCI and the encoded vector sequence of the second UCI, so as to obtain an encoded bit sequence of the UCI.

Specifically, channel interleaving is performed on the encoded vector sequence, $\underline{q}_0^{CSI}, \underline{q}_1^{CSI}, \underline{q}_2^{CSI}, \ldots, \underline{q}_{Q'_{CSI}-1}^{CSI}$, of the first UCI and the encoded vector sequence, $\underline{q}_0^{ACK}, \underline{q}_1^{ACK}, \underline{q}_2^{ACK}, \ldots, \underline{q}_{Q'_{ACK}-1}^{ACK}$, of the second UCI, that is, the encoded vector sequence, $\underline{q}_0^{CSI}, \underline{q}_1^{CSI}, \underline{q}_2^{CSI}, \ldots, \underline{q}_{Q'_{CSI}-1}^{CSI}$, of the first UCI and the encoded vector sequence, $\underline{q}_0^{ACK}, \underline{q}_1^{ACK}, \underline{q}_2^{ACK}, \ldots, \underline{q}_{Q'_{ACK}-1}^{ACK}$, of the second UCI are written into the following matrix:

$$\begin{bmatrix} \underline{y}_0 & \underline{y}_1 & \underline{y}_2 & L & \underline{y}_{C_{max}-1} \\ \underline{y}_{C_{max}} & \underline{y}_{C_{max}+1} & \underline{y}_{C_{max}+2} & L & \underline{y}_{2C_{max}-1} \\ M & M & M & O & M \\ \underline{y}_{(R'_{max}-1)\times C_{max}} & \underline{y}_{(R'_{max}-1)\times C_{max}+1} & \underline{y}_{(R'_{max}-1)\times C_{max}+2} & L & \underline{y}_{(R'_{max}\times C_{max}-1)} \end{bmatrix}$$

where, $C_{max}=N_{symb}^{PUSCH}$; in the matrix, $R'_{max}=M_{SC}^{PUCCH}$, and $M_{SC}^{PUCCH}$ is the number of subcarriers allocated to the physical uplink channel.

Specifically, the writing the encoded vector sequence, $\underline{q}_0^{CSI}, \underline{q}_1^{CSI}, \underline{q}_2^{CSI}, \ldots, \underline{q}_{Q'_{CSI}-1}^{CSI}$, of the first uplink control information and the encoded vector sequence, $\underline{q}_0^{ACK}, \underline{q}_1^{ACK}, \underline{q}_2^{ACK}, \ldots, \underline{q}_{Q'_{ACK}-1}^{ACK}$, of the second uplink control information into the matrix may be implemented in the following three substeps.

Step 903-2-a: First write the encoded vector sequence, $\underline{q}_0^{CSI}, \underline{q}_1^{CSI}, \underline{q}_2^{CSI}, \ldots, \underline{q}_{Q'_{CSI}-1}^{CSI}$, of the first UCI into the matrix, which may be specifically implemented according to the following pseudo code:

---
Set i ,k to 0
while k < $Q'_{CSI}$
$\underline{y}_i = \underline{q}_k^{CSI}$
k = k + 1
i = i + 1
end while
---

Step 903-2-b: Then write the encoded vector sequence, $\underline{q}_0^{ACK}, \underline{q}_1^{ACK}, \underline{q}_2^{ACK}, \ldots, \underline{q}_{Q'_{ACK}-1}^{ACK}$, of the second UCI into a corresponding column, indicated by a column set, in the matrix, where the column set is {1, 4, 7, 10, 2, 3, 8, 9} or {1, 2, 4, 3, 7, 8, 10, 9} or {0, 3, 2, 1}.

A specific implementation manner of the step may be implemented according to Manner 1 in step 303-2-b in Embodiment 1.

Step 903-2-c: Read encoded information bits of each column in the matrix in order successively, to obtain an encoded bit sequence, $h_0, h_1, h_2, \ldots, h_{Q_{RI}+Q_{CQI/PMI}+Q_{ACK}-1}$, of uplink control information.

The step is the same as step 303-2-c in Embodiment 1, which is not repeatedly described herein.

Step: 903-3: Map the encoded bit sequence of the UCI to the physical uplink channel, so as to transmit to the base station.

Figure 11:
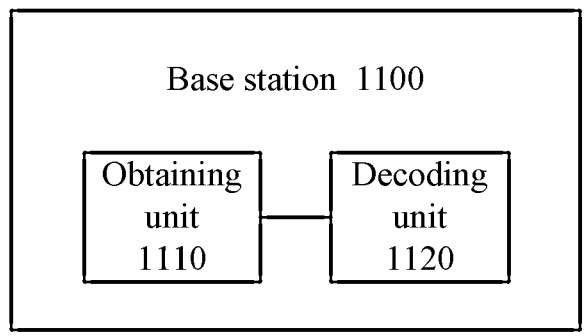
FIG. 11 is a block diagram of a base station according to an embodiment of the present invention.

For example, the encoded bit sequence of the UCI is mapped to a PUSCH, so as to transmit to a base station. In combination with each step described before this step, when the column set in step 903-2-b is {1, 4, 7, 10, 2, 3, 8, 9} or {1, 2, 4, 3, 7, 8, 10, 9}, a schematic diagram of resource mapping of the first UCI and the second UCI is shown in FIG. 11.

Step 904: A base station obtains the resource occupied by the first UCI and obtains the resource occupied by the second UCI.

In step 904, a specific method for the base station to obtain the resource occupied by the first UCI and the resource occupied by the second UCI is consistent with that in step 901, and therefore details are not repeatedly described herein to avoid repetition.

Step 905: The base station performs channel decoding on the first UCI according to the resource occupied by the first UCI to obtain the first UCI transmitted by a UE, and performs channel decoding on the second UCI according to the resource occupied by the second UCI to obtain the second UCI transmitted by the UE.

In step 905, the base station may, according to the resource occupied by the first UCI and the resource occupied by the second UCI, which are obtained in step 904, and according to the method, described in step 903, for the UE to map the encoded bit sequence of the first UCI and the encoded bit sequence of the second UCI to the physical uplink channel for transmission to the base station, perform channel decoding on the first UCI and perform channel decoding on the second UCI.

Step 905 may be implemented in the following two steps.

Step 905-1: The base station separates modulation symbols corresponding to the first UCI on the physical uplink channel according to the resource occupied by the first UCI, and separates modulation symbols corresponding to the second UCI on the physical uplink channel according to the resource occupied by the second UCI.

In step 905-1, the base station may, according to the resource occupied by the first UCI and the resource occupied by the second UCI, which are obtained in step 904, and according to the method, described in step 903, for the UE to map the encoded bit sequence of the first UCI and the encoded bit sequence of the second UCI to the physical uplink channel to transmit to the base station, separate the modulation symbols corresponding to the first UCI on the physical uplink channel, and separate the modulation symbols corresponding to the second UCI.

Step 905-2: The base station performs channel decoding on the first UCI according to the modulation symbols corresponding to the first UCI to obtain the first UCI transmitted by the user equipment, and performs channel decoding on the second UCI according to the modulation symbols corresponding to the second UCI to obtain the second UCI transmitted by the user equipment.

In the embodiment of the present invention, independent encoding is performed on the first UCI and the second UCI, and resources corresponding to the first UCI and the second UCI may be allocated according to performance goals and requirements of different UCI, which ensures that different UCI reaches respective performance goals and requirements, and meanwhile, avoids increasing transmission power according to the UCI with the highest performance requirement, thereby improving power utilization efficiency. At the same time, by multiplexing the CSI of the first reporting type and the CSI of the second reporting type in the first UCI, a problem that when the first UCI only includes the CSI of the first reporting type, the resource reserved for the CSI of the second reporting type is wasted is avoided, thereby improving the resource utilization rate; and at the same time, if the second UCI is mapped to 8 time domain SC-FDMA symbols, a problem that when the number of the RBs allocated to the PUSCH is small, the performance of the second UCI cannot be ensured is solved.

Figure 10:
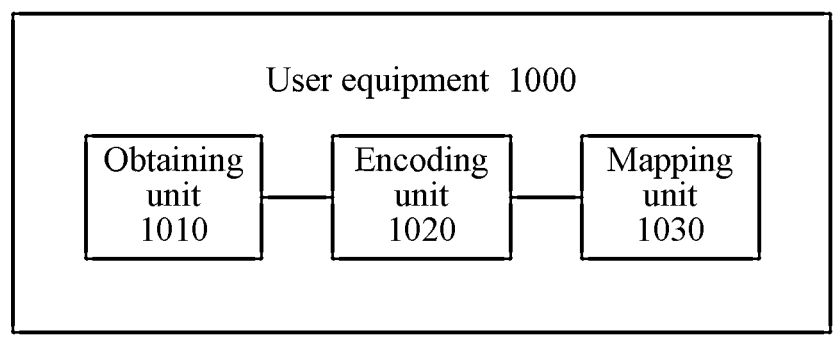
FIG. 10 is a block diagram of a user equipment according to an embodiment of the present invention.

FIG. 10 is a block diagram of a user equipment according to an embodiment of the present invention. A user equipment 1000 in FIG. 10 includes an obtaining unit 1010, an encoding unit 1020 and a mapping unit 1030.

The obtaining unit 1010 obtains a resource occupied by first uplink control information UCI and obtains a resource occupied by second UCI. The encoding unit 1020 performs channel encoding on the first UCI according to the resource occupied by the first UCI to obtain an encoded bit sequence of the first UCI, and performs channel encoding on the second UCI according to the resource occupied by the second UCI to obtain an encoded bit sequence of the second UCI; and the mapping unit 1030 maps the encoded bit sequence of the first UCI and the encoded bit sequence of the second UCI to a physical uplink channel, so as to transmit to a base station.

In the embodiment of the present invention, independent encoding is performed on the first UCI and the second UCI, and resources corresponding to the first UCI and the second UCI may be allocated according to performance goals and requirements of different UCI, which ensures that different UCI reaches respective performance goals and requirements, and meanwhile, avoids increasing transmission power according to the UCI with the highest performance requirement, thereby improving power utilization efficiency.

Each part of the user equipment 1000 in FIG. 10 may separately perform an operation involving the user equipment in embodiments of FIG. 1 to FIG. 9, and details is not repeatedly described to avoid repetition.

Optionally, in an embodiment, the first UCI is periodic CSI, and the second UCI is HARQ-ACK.

Optionally, in another embodiment, the first UCI is periodic CSI, and the second UCI is HARQ-ACK and a scheduling request SR.

Optionally, in another embodiment, in a case that the periodic CSI includes CSI of a first reporting type or CSI of a second reporting type, the obtaining unit 1010 may obtain a resource occupied by CSI of a first reporting type or CSI of a second reporting type. Or, in a case that the periodic CSI includes CSI of a first reporting type and CSI of a second reporting type, the obtaining unit 1010 may obtain the resource occupied by the CSI of the first reporting type and discard the CSI of the second reporting type, or respectively obtain the resource occupied by the CSI of the first reporting type and obtain the resource occupied by the CSI of the second reporting type.

Optionally, in another embodiment, the encoding unit 1030 may, in a case that the resource is the number of modulation symbols, calculate the number of encoded bits occupied by the first UCI according to the number of modulation symbols occupied by the first UCI, and calculate the number of encoded bits occupied by the second UCI according to the number of modulation symbols occupied by the second UCI; perform channel encoding on the first UCI according to the number of encoded bits occupied by the first UCI to obtain an encoded bit sequence of the first UCI, and perform channel encoding on the second UCI according to the number of encoded bits occupied by the second UCI to obtain an encoded bit sequence of the second UCI; or, in a case that the resource is the number of encoded bits, perform channel encoding on the first UCI according to the number of encoded bits occupied by the first UCI to obtain an encoded bit sequence of the first UCI, and perform channel encoding on the second UCI according to the number of encoded bits occupied by the second UCI to obtain an encoded bit sequence of the second UCI.

Optionally, in another embodiment, the number of modulation symbols occupied by the first UCI satisfies $Q'_{CSI}=Q'$ or $Q'_{CSI}=Q'-Q'_{HARQ-ACK}$.

The number of modulation symbols occupied by the second UCI satisfies $Q'_{HARQ-ACK}=\lceil Q'^{*}(O_{HARQ-ACK}/(O_{CSI}+O_{HARQ-ACK}))^{*}\beta_{offset} \rceil$, or $Q'_{HARQ-ACK}=\lceil Q'^{*}(O_{HARQ-ACK}/(O_{CSI}+O_{HARQ-ACK})) \rceil$, or $Q'_{HARQ-ACK}=\lceil (2/3)^{*}Q'^{*}(O_{HARQ-ACK}/O_{CSI}) \rceil$, or $Q'_{HARQ-ACK}=\lceil (O_{HARQ-ACK}^{*}((M_{SC}^{PUCCH} * N_{symb}^{PUCCH})/V_{SF})^{*}\beta_{offset})/O_{CSI} \rceil$, or $Q'_{HARQ-ACK}=N_{symb}^{HARQ-ACK} * M_{SC}^{PUCCH}$, where, $Q'$ is capacity of a physical uplink channel, $O_{HARQ-ACK}$ is the total number of information bits of HARQ-ACK, $O_{CSI}$ is the total number of information bits of the period CSI, $\beta_{offset}$ is a value configured semi-statically by high-layer signaling or a preset value, $M_{SC}^{PUCCH}$ is the number of subcarriers allocated to the physical uplink channel, $N_{symb}^{PUCCH}$ the number of time domain symbols, used for transmitting the UCI, of the physical uplink channel, $V_{SF}$ is the value of a spread spectrum coefficient, and $N_{symb}^{HARQ-ACK}$ is the number of time domain symbols used for transmitting the HARQ-ACK.

Optionally, in another embodiment, the number of encoded bits occupied by the first UCI satisfies $Q_{CSI}=Q'_{CSI}*Q_m$, and the number of encoded bits occupied by the second UCI satisfies $Q_{ACK}=Q'_{HARQ-ACK}*Q_m$, where, $Q'_{CSI}$ is the number of modulation symbols occupied by the first UCI, $Q'_{HARQ-ACK}$ is the number of modulation symbols occupied by the second UCI, and $Q_m$ is a modulation order.

Optionally, in another embodiment, in the case that the periodic CSI includes the CSI of the first reporting type and the CSI of the second reporting type, the encoding unit 1030 may calculate the number of encoded bits occupied by the CSI of the first reporting type according to the number of modulation symbols occupied by the CSI of the first reporting type, and calculate the number of encoded bits occupied by the CSI of the second reporting type according to the number of modulation symbols occupied by the CSI of the second reporting type.

Optionally, in another embodiment, the CSI of the first reporting type is an RI, and the CSI of the second reporting type is a CQI/PMI.

Optionally, in another embodiment, the number of modulation symbols occupied by the CSI of the first reporting type satisfies $$Q'_{RI} = \left\lceil \frac{O_{RI} \times M_{sc}^{PUSCH} \times N_{symb}^{PUSCH} \times \beta_{offset}^{RI}}{O_{CQI-MIN}} \right\rceil \text{ or}$$

$$Q'_{RI} = \left\lceil \frac{O_{RI} \times M_{sc}^{PUSCH} \times N_{symb}^{PUSCH} \times \beta_{offset}^{RI}}{O_{CQI-MIN} + O_{RI}} \right\rceil,$$

the number of modulation symbols occupied by the CSI of the second reporting type satisfies $Q'_{CQI/PMI}=M_{SC}^{PUSCH} \times N_{symb}^{PUSCH}-Q'_{RI}$, and the number of modulation symbols occupied by the second UCI satisfies $$Q'_{HARQ-ACK} = \min\left(\left\lceil \frac{O_{HARQ-ACK} \times M_{sc}^{PUSCH} \times N_{symb}^{PUSCH} \times \beta_{offset}^{HARQ-ACK}}{O_{CQI-MIN}} \right\rceil, 4 \times M_{sc}^{PUSCH}\right) \text{ or}$$

$$Q'_{HARQ-ACK} = \min\left(\left\lceil \frac{O_{HARQ-ACK} \times M_{sc}^{PUSCH} \times N_{symb}^{PUSCH} \times \beta_{offset}^{HARQ-ACK}}{O_{CQI-MIN} + O_{RI}} \right\rceil, 4 \times M_{sc}^{PUSCH}\right) \text{ or}$$

$$Q'_{HARQ-ACK} = \min\left(\left\lceil \frac{O_{HARQ-ACK} \times M_{sc}^{PUSCH} \times N_{symb}^{PUSCH} \times \beta_{offset}^{HARQ-ACK}}{O_{CQI-MIN} + O_{RI}} \right\rceil, 8 \times M_{sc}^{PUSCH}\right),$$

where, $O_{RI}$ is the total number of information bits of the RI, $M_{SC}^{PUSCH}$ is the number of subcarriers allocated to the physical uplink shared channel PUSCH, $N_{symb}^{PUSCH}$ is the number of time domain symbols, used for transmitting the UCI, of the PUSCH, $O_{HARQ-ACK}$ is the total number of information bits of the HARQ-ACK, $O_{CQI-MIN}$ is the total number of information bits of the CQI/PMI, and $\beta_{offset}^{RI}$ and $\beta_{offset}^{HARQ-ACK}$ are values notified by high-layer radio resource offset control signaling and configured semi-statically by high-layer signaling.

Optionally, in another embodiment, the number of encoded bits occupied by the CSI of the first reporting type satisfies $Q_{RI}=Q'_{RI}*Q_m$, the number of encoded bits occupied by the CSI of the second reporting type satisfies $Q_{CQI/PMI}=Q'_{CQI/PMI}*Q_m$, and the number of encoded bits occupied by the second UCI satisfies $Q_{ACK}=Q'_{HARQ-ACK}*Q_m$.

where $Q'_{RI}$ is the number of modulation symbols occupied by the CSI of the first reporting type, $Q'_{CQI/PMI}$ is the number of modulation symbols occupied by the CSI of the second reporting type, $Q'_{HARQ-ACK}$ is the number of modulation symbols occupied by the second UCI, and $Q_m$ is a modulation order.

Optionally, in another embodiment, the encoding unit 1020 may perform channel encoding on the CSI of the first reporting type according to the number of encoded bits occupied by the CSI of the first reporting type to obtain the encoded bit sequence of the CSI of the first reporting type, and perform channel encoding on the CSI of the second reporting type according to the number of encoded bits occupied by the CSI of the second reporting type to obtain the encoded bit sequence of the CSI of the second reporting type; and multiplex the encoded bit sequence of the CSI of the first reporting type and the encoded bit sequence of the CSI of the second reporting type, to obtain the encoded bit sequence of the first UCI.

Optionally, in another embodiment, the mapping unit 1030 may convert the encoded bit sequence of the first UCI into an encoded vector sequence of the first UCI, and convert the encoded bit sequence of the second UCI into an encoded vector sequence of the second UCI; perform channel interleaving on the encoded vector sequence of the first UCI and the encoded vector sequence of the second UCI, to obtain an encoded bit sequence of UCI; and map the encoded bit sequence of the UCI to the physical uplink channel, so as to transmit to a base station.

Optionally, in another embodiment, the mapping unit 1030 may first write the encoded vector sequence of the first UCI into a matrix, write the encoded vector sequence of the second UCI into a column, indicated by a column set, in the matrix, and then read encoded bits of each column in the matrix in order successively, to obtain the encoded bit sequence of the UCI. For example, the mapping unit 1030 may write the encoded vector sequence of the first UCI into the matrix to make the matrix full.

Optionally, in another embodiment, the encoding unit 1020 may write the encoded vector sequence of the second UCI into a column, indicated by a column set, in the matrix, write the encoded vector sequence of the first UCI into the matrix, and read encoded bits of each column in the matrix in order successively, to obtain the encoded bit sequence of the UCI.

Optionally, in another embodiment, the foregoing column set may be {0, 1}, or {0, 3, 2, 1}, or {1, 2}, or {0, 2}, or {0, 5, 4, 1, 2, 3}, or {2, 3}, or {1, 4}, or {1, 4, 3, 2}, or {1, 4, 7, 10, 2, 3, 8, 9}, or {1, 2, 4, 3, 7, 8, 10, 9}.

FIG. 11 is a block diagram of a base station according to an embodiment of the present invention. A base station 1100 in FIG. 11 includes an obtaining unit 1110 and a decoding unit 1120.

The obtaining unit 1110 obtains a resource occupied by first uplink control information UCI and obtains a resource occupied by second UCI. The decoding unit 1120 performs channel decoding on the first UCI according to the resource occupied by the first UCI to obtain the first UCI transmitted by a user equipment, and performs channel decoding on the second UCI according to the resource occupied by the second UCI to obtain the second UCI transmitted by the user equipment.

In the embodiment of the present invention, independent encoding is performed on the first UCI and the second UCI, and resources corresponding to the first UCI and the second UCI may be allocated according to performance goals and requirements of different UCI, which ensures that different UCI reaches respective performance goals and requirements, and meanwhile, avoids increasing transmission power according to the UCI with the highest performance requirement, thereby improving power utilization efficiency.

Each part of the base station 1100 in FIG. 11 may separately perform operations involving the base station in embodiments in FIG. 1 to FIG. 9, which is not repeatedly described to avoid repetition.

Optionally, in an embodiment, the first UCI is CSI, and the second UCI is HARQ-ACK. Or the first UCI is CSI, and the second UCI is HARQ-ACK and a scheduling request SR.

Optionally, in an embodiment, the obtaining unit 1110 may, in a case that the period CSI includes CSI of a first reporting type or CSI of a second reporting type, obtain a resource occupied by the CSI of the first reporting type or the CSI of the second reporting type; or in a case that the period CSI includes CSI of a first reporting type and CSI of a second reporting type, obtain the resource occupied by the CSI of the first reporting type and discard the CSI of the second reporting type, or respectively obtain the resource occupied by the CSI of the first reporting type and obtain the resource occupied by the CSI of the second reporting type.

Other operations of the obtaining unit 1110 are the same as those of the obtaining unit 1010 in FIG. 10, which are not repeatedly described to avoid repetition.

Optionally, in an embodiment, the decoding unit 1120 may separate modulation symbols corresponding to the first UCI on a physical uplink channel according to the resource occupied by the first UCI, and separate modulation symbols corresponding to the second UCI on a physical uplink channel according to the resource occupied by the second UCI; perform channel decoding on the first UCI according to the modulation symbols corresponding to the first UCI to obtain the first UCI transmitted by the user equipment, and perform channel decoding on the second UCI according to the modulation symbols corresponding to the second UCI to obtain the second UCI transmitted by the user equipment.

Other operations of the decoding unit 1120 correspond to those of the encoding unit 1020 and/or the mapping unit 1030 in FIG. 10, which are not repeatedly described to avoid repetition.

A communication system according to an embodiment of the present invention may include the user equipment 1000 or the base station 1100.

Persons of ordinary skill in the art may be aware that units and algorithm steps of each example described in combination with the embodiments disclosed herein may be implemented by electronic hardware, or a combination of computer software and electronic hardware. Whether these functions are performed in a hardware or software manner depends on particular applications and design constraint conditions of the technical solution. Persons skilled in the art can use different methods to implement the described functions for each particular application, but it should not be considered that the implementation goes beyond the scope of the present invention.

Persons skilled in the art can clearly understand that, for the purpose of convenient and brief description, for a detailed working process of the foregoing system, device and unit, reference may be made to a corresponding process in the foregoing method embodiments, and details are not repeatedly described herein.

In the several embodiments provided in the present application, it should be understood that the disclosed system, apparatus, and method may be implemented in other manners. For example, the described apparatus embodiments are merely exemplary. For example, dividing of the units is merely a type of logical function dividing, and there may be other dividing manners during actual implementation. For example, a plurality of units or components can be combined or integrated into another system, or some features can be ignored or not performed. In addition, the shown or discussed coupling or direct coupling or communication connection may be implemented through some interfaces. The indirect coupling or communication connections between the apparatuses or units may be electronic, mechanical, or other forms.

The units described as separate components may be or may not be physically separated, and parts displayed as units may be or may not be physical units, that is, may be located in one position, or may be distributed on a plurality of network units. A part or all of the units may be selected according to actual needs to achieve the objective of the solution of the embodiments.

In addition, functional units in the embodiments of the present invention may be integrated in one processing unit, each of the units may exist alone physically, and two or more units may also be integrated in one unit.

When the function is implemented in a form of a software functional unit and sold or used as an independent product, the function may be stored in a computer readable storage medium. Based on such understanding, the technical solution of the present invention, or the part contributing to the prior art, or all or a part of the technical solutions may be embodied in a form of a software product. The computer software product is stored in a storage medium, and includes several instructions for instructing a computer device (which may be a personal computer, a server, or network device, or the like) to perform all or a part of the steps of the method described in the embodiments of the present invention. The foregoing storage medium includes any medium that is capable of storing program code, such as, a USB flash disk, a mobile hard disk, a read-only memory (ROM, Read-Only Memory), a random access memory (RAM, Random Access Memory), a magnetic disk or an optical disc.

The foregoing description is merely specific embodiments of the present invention, but is not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the appended claims.

What is claimed is:

1. A method for transmitting control information, comprising:
   obtaining a resource occupied by first uplink control information (UCI) and obtaining a resource occupied by second UCI;
   performing channel encoding on the first UCI according to the resource occupied by the first UCI to obtain an encoded bit sequence of the first UCI, and performing channel encoding on the second UCI according to the resource occupied by the second UCI to obtain an encoded bit sequence of the second UCI; and mapping the encoded bit sequence of the first UCI and the encoded bit sequence of the second UCI to a physical uplink channel, so as to transmit to a base station, wherein the first UCI is periodic channel state information CSI and the second UCI is a hybrid automatic repeat request-acknowledgment message HARQ-ACK; or the first UCI is periodic channel state information CSI and the second UCI is a hybrid automatic repeat request-acknowledgment message HARQ-ACK and a scheduling request SR, wherein the obtaining a resource occupied by first UCI comprises:

in a case that the periodic CSI comprises CSI of a first reporting type or CSI of a second reporting type, obtaining a resource occupied by the CSI of the first reporting type or the CSI of the second reporting type; or, in a case that the periodic CSI comprises CSI of a first reporting type and CSI of a second reporting type, obtaining a resource occupied by the CSI of the first reporting type and discarding the CSI of the second reporting type, or obtaining a resource occupied by the CSI of the first reporting type and obtaining a resource occupied by the CSI of the second reporting type, wherein the performing channel encoding on the first UCI according to the resource occupied by the first UCI to obtain an encoded bit sequence of the first UCI and performing channel encoding on the second UCI according to the resource occupied by the second UCI to obtain an encoded bit sequence of the second UCI comprise:

in a case that the resource is the number of modulation symbols, calculating the number of encoded bits occupied by the first UCI according to the number of modulation symbols occupied by the first UCI, and calculating the number of encoded bits occupied by the second UCI according to the number of modulation symbols occupied by the second UCI; performing channel encoding on the first UCI according to the number of encoded bits occupied by the first UCI to obtain the encoded bit sequence of the first UCI, and performing channel encoding on the second UCI according to the number of encoded bits occupied by the second UCI to obtain the encoded bit sequence of the second UCI; or, in a case that the resource is the number of encoded bits, performing channel encoding on the first UCI according to the number of encoded bits occupied by the first UCI to obtain the encoded bit sequence of the first UCI, and performing channel encoding on the second UCI according to the number of encoded bits occupied by the second UCI to obtain the encoded bit sequence of the second UCI, wherein the number of modulation symbols occupied by the first UCI satisfies $Q'_{CSI}=Q'$ or $Q'_{CSI}=Q'-Q'_{HARQ-ACK}$, and the number of modulation symbols occupied by the second UCI satisfies $$Q'_{HARQ-ACK}=\lceil Q'*(O_{HARQ-ACK}/(O_{CSI}+O_{HARQ-ACK}))*\beta_{offset}\rceil, \text{ or}$$

$$Q'_{HARQ-ACK}=\lceil Q'*(O_{HARQ-ACK}/(O_{CSI}+O_{HARQ-ACK}))\rceil, \text{ or}$$

$$Q'_{HARQ-ACK}=\lceil (2/3)*Q'*(O_{HARQ-ACK}/O_{CSI})\rceil, \text{ or}$$

$$Q'_{HARQ-ACK}=\lceil (O_{HARQ-ACK}*((M_{SC}^{PUCCH}*N_{symb}^{PUCCH})/V_{SF})*\beta_{offset})/O_{CSI}\rceil, \text{ or}$$

$$Q'_{HARQ-ACK}=N_{symb}^{HARQ-ACK}*M_{SC}^{PUCCH},$$

wherein Q' is capacity of the physical uplink channel, $O_{HARQ-ACK}$ is the total number of information bits of the HARQ-ACK, $O_{CSI}$ the total number of information bits of the periodic CSI, $\beta_{offset}$ is a value configured semi-statically by high-layer signaling or a preset value, $M_{SC}^{PUCCH}$ is the number of subcarriers allocated to the physical uplink channel, $N_{symb}^{PUCCH}$ is the number of time domain symbols, used for transmitting the UCI, of the physical uplink channel, $V_{SF}$ is the value of a spread spectrum coefficient, and $N_{symb}^{HARQ-ACK}$ is the number of time domain symbols used for transmitting the HARQ-ACK.

2. The method according to claim 1, wherein, the number of encoded bits occupied by the first UCI satisfies $Q_{CSI}=Q'_{CSI}*Q_m$, and the number of encoded bits occupied by the second UCI satisfies $$Q_{ACK}=Q'_{HARQ-ACK}*Q_m,$$

wherein $Q'_{CSI}$ is the number of modulation symbols occupied by the first UCI, $Q'_{HARQ-ACK}$ is the number of modulation symbols occupied by the second UCI, and $Q_m$ is a modulation order.

3. A user equipment, comprising:

an obtaining unit, configured to obtain a resource occupied by first uplink control information (UCI) and obtain a resource occupied by second UCI;

an encoding unit, configured to perform channel encoding on the first UCI according to the resource occupied by the first UCI to obtain an encoded bit sequence of the first UCI and perform channel encoding on the second UCI according to the resource occupied by the second UCI to obtain an encoded bit sequence of the second UCI; and a mapping unit, configured to map the encoded bit sequence of the first UCI and the encoded bit sequence of the second UCI to a physical uplink channel, so as to transmit to a base station, wherein the first UCI is periodic channel state information CSI and the second UCI is a hybrid automatic repeat request-acknowledgment message HARQ-ACK; or the first UCI is periodic channel state information CSI and the second UCI is a hybrid automatic repeat request-acknowledgment message HARQ-ACK and a scheduling request SR, wherein the obtaining unit is specifically configured to, in a case that the periodic CSI comprises CSI of a first reporting type or CSI of a second reporting type, obtain a resource occupied by the CSI of the first reporting type or the CSI of the second reporting type; or, in a case that the periodic CSI comprises CSI of a first reporting type and CSI of a second reporting type, obtain the resource occupied by the CSI of the first reporting type and discard the CSI of the second reporting type, or, respectively obtain the resource occupied by the CSI of the first reporting type and obtain the resource occupied by the CSI of the second reporting type, wherein the encoding unit is specifically configured to, in a case that the resource is the number of modulation symbols, calculate the number of encoded bits occupied by the first UCI according to the number of modulation symbols occupied by the first UCI, and calculate the number of encoded bits occupied by the second UCI according to the number of modulation symbols occupied by the second UCI; perform channel encoding on the first UCI according to the number of encoded bits occupied by the first UCI to obtain an encoded bit sequence of the first UCI, and perform channel encoding on the second UCI according to the number of encoded bits occupied by the second UCI to obtain an encoded bit sequence of the second UCI; or, in a case that the resource is the number of encoded bits, perform channel encoding on the first UCI according to the number of encoded bits occupied by the first UCI to obtain an encoded bit sequence of the first UCI, and perform channel encoding on the second UCI according to the number of encoded bits occupied by the second UCI to obtain an encoded bit sequence of the second UCI, wherein the number of modulation symbols occupied by the first UCI satisfies $Q'_{CSI}=Q'$ or $Q'_{CSI}=Q'-Q'_{HARQ-ACK}$, and the number of modulation symbols occupied by the second UCI satisfies $$Q'_{HARQ-ACK} = \lfloor Q'^{*}(O_{HARQ-ACK}/(O_{CSI}+O_{HARQ-ACK}))^{*}\beta_{offset}\rfloor, \text{ or}$$

$$Q'_{HARQ-ACK} = \lfloor Q'^{*}(O_{HARQ-ACK}/(O_{CSI}+O_{HARQ-ACK}))\rfloor, \text{ or}$$

$$Q'_{HARQ-ACK} = \lfloor (2/3)^{*}Q'^{*}(O_{HARQ-ACK}/O_{CSI})\rfloor, \text{ or}$$

$$Q'_{HARQ-ACK} = \lfloor (O_{HARQ-ACK}^{*}((M_{SC}^{PUCCH}*N_{symb}^{PUCCH})/V_{SF})^{*}\beta_{offset})/O_{CSI}\rfloor,$$
or $$Q'_{HARQ-ACK} = N_{symb}^{HARQ-ACK} * M_{SC}^{PUCCH},$$

wherein Q' is capacity of the physical uplink channel, $O_{HARQ-ACK}$ is the total number of information bits of the HARQ-ACK, $O_{CSI}$ the total number of information bits of the periodic CSI, $\beta_{offset}$ is a value configured semi-statically by high-layer signaling or a preset value, $M_{SC}^{PUCCH}$ is the number of subcarriers allocated to the physical uplink channel, $N_{symb}^{PUCCH}$ is the number of time domain symbols, used for transmitting the UCI, of the physical uplink channel, $V_{SF}$ is the value of a spread spectrum coefficient, and $N_{symb}^{HARQ-ACK}$ is the number of time domain symbols used for transmitting the HARQ-ACK.

4. The user equipment according to claim 3, wherein the number of encoded bits occupied by the first UCI satisfies $Q_{CSI}=Q'_{CSI}*Q_m$, and the number of encoded bits occupied by the second UCI satisfies $$Q_{ACK}=Q'_{HARQ-ACK}*Q_m$$

wherein $Q'_{CSI}$ is the number of modulation symbols occupied by the first UCI, $Q'_{HARQ-ACK}$ is the number of modulation symbols occupied by the second UCI, and $Q_m$ is a modulation order.

* * * * *